United States Patent
Sekiguchi

(10) Patent No.: US 8,094,197 B2
(45) Date of Patent: Jan. 10, 2012

(54) IMAGE RECORDING SYSTEM HAVING A CONVERSION APPARATUS

(75) Inventor: Hiroshi Sekiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1055 days.

(21) Appl. No.: 11/832,252

(22) Filed: Aug. 1, 2007

(65) Prior Publication Data

US 2008/0180531 A1    Jul. 31, 2008

(30) Foreign Application Priority Data

Aug. 9, 2006  (JP) ................................. 2006-217437

(51) Int. Cl.
*H04N 5/225*  (2006.01)
*G06F 15/00*  (2006.01)

(52) U.S. Cl. ............. 348/207.2; 348/207.1; 348/207.99; 358/1.1; 358/1.5

(58) Field of Classification Search ............... 348/207.2, 348/207.99; 358/1.15
See application file for complete search history.

(56) References Cited

U.S. PATENT DOCUMENTS

| | | | |
|---|---|---|---|
| 7,561,288 B2* | 7/2009 | Yano et al. ................... | 358/1.15 |
| 2002/0080250 A1* | 6/2002 | Ogawa et al. ................ | 348/232 |
| 2002/0156947 A1* | 10/2002 | Nishio ........................... | 710/36 |
| 2003/0067620 A1* | 4/2003 | Masumoto et al. .......... | 358/1.13 |
| 2003/0081235 A1* | 5/2003 | Tanaka et al. ................ | 358/1.13 |
| 2003/0084085 A1* | 5/2003 | Breidenbach et al. ........... | 709/1 |
| 2003/0158979 A1* | 8/2003 | Tateyama et al. ............... | 710/33 |
| 2004/0070672 A1* | 4/2004 | Iwami et al. ................ | 348/207.2 |
| 2004/0169727 A1* | 9/2004 | Romano et al. ............ | 348/207.2 |
| 2004/0196484 A1* | 10/2004 | Masumoto et al. .......... | 358/1.13 |
| 2006/0044395 A1* | 3/2006 | Aichi et al. ................. | 348/207.2 |
| 2006/0082821 A1* | 4/2006 | Yamaya ....................... | 358/1.15 |
| 2006/0150236 A1* | 7/2006 | Sakuda et al. ................ | 725/135 |
| 2006/0158518 A1* | 7/2006 | Sakai .......................... | 348/207.2 |
| 2007/0024903 A1* | 2/2007 | Kitahara et al. ............ | 358/1.15 |
| 2007/0053376 A1* | 3/2007 | Oshima et al. ................ | 370/462 |

(Continued)

FOREIGN PATENT DOCUMENTS

JP    2005-078241    3/2005

(Continued)

OTHER PUBLICATIONS

Albright, Shivaun "PrintEnhanced:1 Service Template Version 1.01", May 4, 2005.

(Continued)

*Primary Examiner* — Sinh Tran
*Assistant Examiner* — Selam Gebriel
(74) *Attorney, Agent, or Firm* — SNR Denton US LLP

(57) ABSTRACT

An image recording system includes an image supply apparatus compatible with a first image recording service standard, an image recording apparatus compatible with a second image recording service standard, and a conversion apparatus connected, as a pseudo image recording apparatus compatible with the first standard, to the image supply apparatus via a communication medium compatible with the first standard and connected, as a pseudo image supply apparatus compatible with the second standard, to the image recording apparatus via a communication medium compatible with the second standard. The conversion apparatus converts a command received from the image supply apparatus into a command complying with the second standard before transmitting it to the image recording apparatus, and converts a command received from the image recording apparatus or event information relating to an image recording process into a message complying with the first standard before transmitting it to the image supply apparatus.

19 Claims, 23 Drawing Sheets

U.S. PATENT DOCUMENTS

2007/0195362 A1* 8/2007 Yamada et al. .............. 358/1.15
2008/0137131 A1* 6/2008 Cavill et al. .................. 358/1.15
2008/0309961 A1* 12/2008 Aichi et al. .................. 358/1.15

FOREIGN PATENT DOCUMENTS

| JP | 2005-128869 | 5/2005 |
|---|---|---|
| JP | 2005-157540 | 6/2005 |
| JP | 2005-217974 | 8/2005 |
| JP | 2005-222234 | 8/2005 |

OTHER PUBLICATIONS

Japanese Office Action dated Aug. 5, 2008 for Application No. 2006-217437.

* cited by examiner

FIG. 13

```
<?xml version="1.0"?>
<dps xmlns="http://www.cipa.jp/dps/schema/">
 <input>
  <startJob>
   <jobConfig>
    <quality>50000000</quality>
    <paperSize>51010000</paperSize>
```

FIG. 15

```
<?xml version="1.0" encoding="UTF-8"?>
<html xmlns="http://www.w3.org/1999/xhtml">
<head>
<style type="text/css">
@page {
   size: 8.5in 11in;
   margin: 0.5in;
}
</style>
</head>
<body>
 <img class="landscape" src="m1.jpg"/>
 <br/> Mt. Rainer
 <br/> 11/20/02 14:23
```

FIG. 16A

PAPER SIZE AND ORIENTATION IS SET TO A4 AND LANDSCAPE ORIENTATION

MARGIN VALUE IS SET TO 0

LEFT-OFFSET IS SPECIFIED IN LAYOUT BECAUSE HORIZONTAL EDGES OF IMAGE ARE LONGER

IMAGE IS NOT ROTATED

```
<head>
  :
  <style type="text/css">
    :
    @media print { @page { size:297mm 210mm; margin:0mm; } }
    :
    div.div_00 { overflow:hidden; padding:0; position:absolute; top:0mm; left:0mm; width:297mm; height:210mm; }
    :
    img.img_32 { width:315.315mm; height:210mm; margin-top:0mm; margin-left:-9.158mm; image-orientation:0deg; }
    p.p_date { position:absolute; margin:0mm; left:0mm; bottom:0mm; text-align:right; white-space:pre; width:297mm;
    color:red; font-family:sans-serif; font-size:8pt; font-weight:normal; }
    :
  </style>
</head>
<body>
  <div class="div_00">
    <img src="http://192.168.80.4:3456/images/family.jpg" class="img_32" alt="photo" />
    <p class="p_date">2005/07/02</p>
```

SPECIFY DIV BOX REGION IN WHICH THE IMAGE IS TO BE PASTED

SPECIFY IMAGE TO BE PRINTED

SPECIFY AREA IN WHICH DATE CHARACTER STRING IS TO BE PLACED

DATE CHARACTERS TO BE INSERTED

IMAGE LAYOUT IS THUS OBTAINED

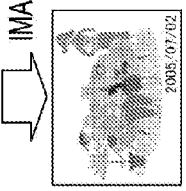

FIG. 16B
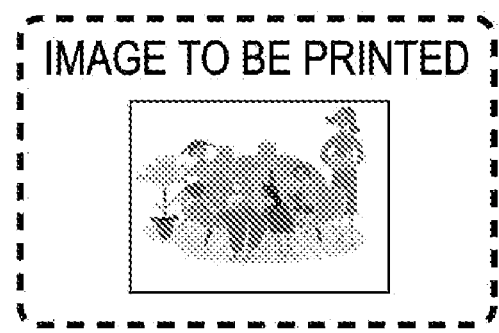
IMAGE TO BE PRINTED
NORMALLY, PAPER IS FED IN ITS LONGITUDINAL DIRECTION.
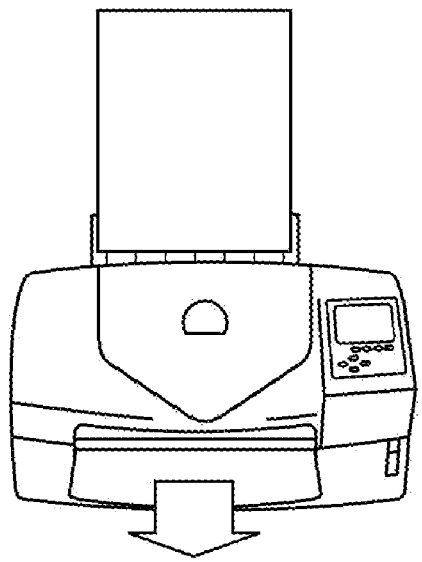
THIS IS AN EXPECTED OUTPUT IMAGE.

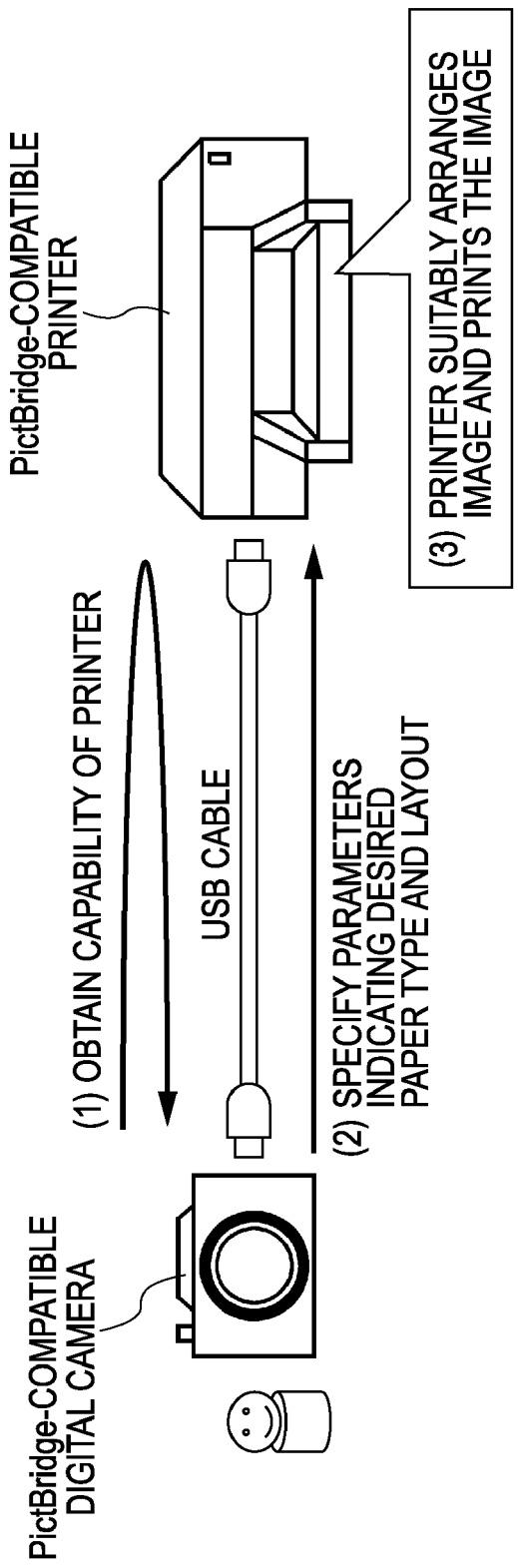

IMAGE RECORDING SYSTEM HAVING A CONVERSION APPARATUS

CROSS REFERENCES TO RELATED APPLICATIONS

The present invention contains subject matter related to Japanese Patent Application JP 2006-217437 filed in the Japanese Patent Office on Aug. 9, 2006, the entire contents of which are incorporated herein by reference.

BACKGROUND OF THE INVENTION

1. Field of the Invention

The present invention relates to image recording systems in which image data supplied from image supply apparatuses is recorded using image recording apparatuses. In particular, the present invention relates to image recording systems in which image data supplied from image supply apparatuses is transferred to image recording apparatuses via communication media for recording.

More specifically, the present invention relates to an image recording system in which image data supplied from an image supply apparatus is recorded using an image recording apparatus in the coexistence of a plurality of standards for providing image recording services. In particular, the present invention relates to an image recording system in which image data supplied from an image supply apparatus compatible with a first standard for providing an image recording service is recorded using an image recording apparatus compatible with a second standard for providing an image recording service.

2. Description of the Related Art

Cameras have a long history as devices for recording visual information. Recently, in place of film cameras photographing images using films and photosensitive plates, digital cameras that digitally encode images captured using solid-state imaging elements such as charge coupled device (CCD) or complementary metal-oxide semiconductor (CMOS) imaging elements have become widespread. The digital cameras have advantages of allowing digitally encoded images to be stored in memory devices for image processing and image management using computers, and of avoiding the lifetime problem of films.

In many cases, images captured using digital cameras are encoded and compressed within the maim body of the cameras using techniques such as the Joint Picture Experts Group (JPEG). The resulting images are stored in built-in memory devices or media placed in the cameras, such as memory stick® devices, and are loaded into personal computers via the media or connection cables such as a universal serial bus (USB) cable. The images are subjected to various types of data processing including image processing, such as storing and managing image files, reproducing the image files, and converting the quality of the image files, image editing, and image printing, in rich graphical user interface (GUI) operation environments available on the personal computers.

However, when images captured using digital cameras are printed through personal computers, application software for transferring data and printing the images is necessary, and the installing operation is time-consuming.

Recently, a "direct printing" technique has been increasingly available. The direct-printing technique allows direct printing of images captured using digital cameras by connecting the digital cameras to printers without loading image data of the images into personal computers.

For example, the Camera & Imaging Products Association (CIPA) established "PictBridge," which is a communication standard for providing direct printing between digital cameras and printers. PictBridge-compatible devices are connected via a USB cable to enable direct printing without installing special software. A user can operate buttons, etc., of a digital camera to easily print an image being displayed on a liquid crystal monitor of the digital camera. The user can also specify print settings (e.g., paper size), and if no settings are specified, the image can be printed according to the default settings of the printer. As well as printing a specified image, various functions such as index printing in which a list of thumbnail images is printed, the production of a plurality of prints of the same image, and the production of prints with date can also be used. Further, if an event such as an error occurs during printing, an error message can be displayed on the liquid crystal monitor or the like of the digital camera.

A large number of recent commercially available digital cameras and printers are compatible with the PictBridge standard. In the PictBridge standard, USB is used as a physical layer, and Picture Transfer Protocol (PTP) is used as the data communication protocol. PTP is a protocol for transferring an image from a digital camera to a computer via a USB connection, and is supported on, for example, Windows® XP or MacOS X.

For example, a digital still camera in which Mass Storage, PTP, or PictBridge is selectable as the USB-based communication standard has been proposed (see, for example, Japanese Unexamined Patent Application Publication No. 2005-128869). If a device connected to the digital still camera is not compatible with the currently set communication standard, inside the digital still camera, the communication line is initialized to change the communication standard.

Internet protocol (IP) networks can also be used as means other than USB connections for establishing connections between digital cameras and printers. While PTP is based on USB connections, an extended, IP-compatible version of PTP, called PTP/IP, in which data can also be transferred via wireless local area networks (LANs), was released to the public by CIPA.

Universal Plug and Play (UPnP™) proposed by Microsoft Corporation is one known technique standard for mutually providing functions (services) between a plurality of devices over IP networks (see, for example, "Universal Plug and Play Device Architecture Version 1.0"). Devices on a UPnP network are classified into service providing devices and service controlling devices called control points, between which notification and detection of services are performed. In UPnP, prior to the establishment of a connection, a device obtains an IP address from a Dynamic Host Configuration Protocol (DHCP) server or assigns itself an IP address using Auto-IP. Then, the device accesses a UPnP network. When accessing a UPnP network, the device transmits information concerning the type of the device via multicasting to notify a control point of the presence of the device. Upon recognizing the presence of the device, the control point obtains data written in an extensible markup language (XML) from the device, which includes information relating to the type of the device and the service available from the device. At this time, the control point can recognize the information supported by the device, and can therefore control the device remotely. For example, a digital camera that can access a network as a UPnP control device and that can automatically select a specific device (e.g., printer) to be controlled from among a plurality of UPnP devices present on the network has been proposed (see, for example, Japanese Unexamined Patent Application Publication No. 2005-217974).

One known communication standard based on UPnP™ that allows direct printing between printers and devices such as a digital camera is "PrintEnhanced". In the PrintEnhanced standard, a digital camera can be connected not only to a printer but also to other various UPnP-compatible digital devices over an IP network such as a wireless LAN. The prevalence of the PrintEnhanced standard is lower than that of the above-described PictBridge standard. However, due to the enjoyment of the standard procedures or functions specified in UPnP, such as assignment of IP addresses, name solution, device discovery, and recognition of device functions, the PrintEnhanced standard will be able to be used in more cases than USB connections.

The two direct printing standards, namely, PictBridge and PrintEnhanced, provide different connection styles between digital cameras and printers, and devices supporting the standards are also different. In the future, therefore, both standards will coexist in a manner that permits both standards to be used in different ways according to the application, rather than to be converged into either standard.

Recently, wireless LAN has also been widely adopted for home use, and users purchase PrintEnhanced-compatible digital cameras to enable direct printing without using any cable. However, due to the lower prevalence of PrintEnhanced-compatible printers, it is difficult to perform direct printing from PrintEnhanced-compatible digital cameras in the existence of only PictBridge-compatible printers.

SUMMARY OF THE INVENTION

It is therefore desirable to provide an improved image recording system in which image data supplied from an image supply apparatus can appropriately be recorded using an image recording apparatus in the coexistence of a plurality of standards for providing image recording services.

It is further desirable to provide an improved image recording system in which image data supplied from an image supply apparatus compatible with the PrintEnhanced standard via an IP network such as a wireless LAN can be recorded using a USB-connectable image recording apparatus compatible with the PictBridge standard.

According to a first embodiment of the present invention, there is provided an image recording system for providing an image data recording service, including the following elements. An image supply apparatus compatible with a first standard for providing an image recording service is configured to supply image data. An image recording apparatus compatible with a second standard for providing an image recording service is configured to record the image data. A conversion apparatus is connected, as a pseudo image recording apparatus compatible with the first standard, to the image supply apparatus via a first communication medium compatible with the first standard, and is connected, as a pseudo image supply apparatus compatible with the second standard, to the image recording apparatus via a second communication medium compatible with the second standard, the conversion apparatus being configured to convert a command received from the image supply apparatus into a command complying with the second standard and transmit the command complying with the second standard to the image recording apparatus, and configured to convert a command received from the image recording apparatus or event information relating to an image recording process into a message complying with the first standard and transmit the message complying with the first standard to the image supply apparatus.

The term "system" as used herein refers to a logical collection of a plurality of apparatuses (or function modules implementing specific functions), and the apparatuses and function modules may or may not be accommodated in a single housing.

A "direct printing" technique that allows direct printing of image data captured using a digital camera by directly connecting the digital camera to a printer for printing without loading the image data into a personal computer has become increasingly available. Currently, there are two direct-printing standards, PictBridge and PrintEnhanced, and these two standards will coexist in the future. However, due to the lower prevalence of PrintEnhanced-compatible printers, there is a problem in that it is difficult to realize direct printing from PrintEnhanced-compatible digital cameras in the existence of only PictBridge-compatible printers.

In the image recording system according to the embodiment of the present invention, therefore, the conversion apparatus is provided between the image supply apparatus such as a digital camera compatible with the first standard, e.g., PrintEnhanced, and the image recording apparatus such as a printer compatible with the second standard, e.g., PictBridge.

The conversion apparatus is connected to the PrintEnhanced-compatible image supply apparatus via a communication medium such as a wireless LAN, and is also connected to the PictBridge-compatible image recording apparatus via a communication medium such as a USB cable. Further, the conversion apparatus is configured to convert a command received from the PrintEnhanced-compatible image supply apparatus into a PictBridge command, and to transmit the resulting command to the image recording apparatus. The conversion apparatus is also configured to convert a command received from the PictBridge-compatible image recording apparatus or event information relating to an image recording process into a PrintEnhanced message, and to transmit the resulting message to the image supply apparatus.

Therefore, as viewed from the side of the PrintEnhanced-compatible image supply apparatus, an image is directly recorded using the PrintEnhanced-compatible image recording apparatus. As viewed from the side of the PictBridge-compatible image recording apparatus, image data supplied from the PictBridge-compatible image supply apparatus is directly recorded.

In the connection of two completely different types of printing services such as PrintEnhanced and PictBridge, it is technically difficult to completely convert a command between the two printing services.

Specifically, it is specified in PictBridge that an image-recording layout be determined on the image recording apparatus side, and a mechanism in which the capability of the image recording apparatus is sent to the image supply apparatus is provided. In PrintEnhanced, on the other hand, it is specified that an image-recording layout be determined on the image supply apparatus side, and only a portion of the capability of the image recording apparatus is sent to the image supply apparatus. In this case, if the PrintEnhanced-compatible image supply apparatus issues an image recording request in a manner similar to that in which the PrintEnhanced-compatible image supply apparatus issues a request to a PrintEnhanced-compatible image recording apparatus, there is a possibility of specifying an image-recording layout unavailable on the PictBridge-compatible image recording apparatus that actually records an image.

Therefore, upon receiving a script including information relating to an image-recording layout from the PrintEnhanced-compatible image supply apparatus, the conversion apparatus extracts from the script a portion available on the PictBridge-compatible image recording apparatus, converts the extracted portion into a script in a PictBridge-compatible format, and transmits the resulting script to the PictBridge-compatible image recording apparatus.

Further, upon establishing a connection with the PictBridge-compatible image recording apparatus, the conversion apparatus obtains a profile from the image recording apparatus, and creates a profile of a PrintEnhanced-compatible image recording apparatus. When accessing a wireless LAN, the conversion apparatus embeds identification information in the created profile of a PrintEnhanced-compatible image recording apparatus, the identification information indicating that the conversion apparatus accessing the wireless LAN acts as a pseudo PrintEnhanced-compatible image recording apparatus.

In this case, upon establishing a connection with the conversion apparatus via the wireless LAN, the PrintEnhanced-compatible image supply apparatus can identify that the party on the other side of the connection is actually a conversion apparatus on the basis of the identification information embedded in the profile even though a PrintEnhanced-compatible image recording apparatus is described in the profile. Then, the PrintEnhanced-compatible image supply apparatus provides a user with minimum operating means for specifying only an image-recording layout that can be set by the image supply apparatus according to the PictBridge standard.

According to a second embodiment of the present invention, there is provided a computer-readable computer program for executing a process on a computer for recording image data supplied from an image supply apparatus compatible with a first standard for providing an image recording service using an image recording apparatus compatible with a second standard for providing an image recording service, the computer program allowing the computer to execute a first command converting step of converting a command received from the image supply apparatus into a command complying with the second standard and transmitting the command complying with the second standard to the image recording apparatus; and a second command converting step of converting a command received from the image recording apparatus or event information relating to an image recording process into a message complying with the first standard and transmitting the message complying with the first standard to the image supply apparatus.

The computer program according to the second embodiment of the present invention defines a computer program written in a computer-readable format for implementing a predetermined process on a computer. In other words, the computer program according to the second embodiment of the present invention is installed in a computer so that a cooperative action can be exerted on the computer to allow the computer to operate as the conversion apparatus in the image recording system according to the first embodiment of the present invention to implement a direct recording process between the image supply apparatus and the image recording apparatus.

According to an embodiment of the present invention, therefore, an improved image recording system in which image data supplied from an image supply apparatus can appropriately be recorded using an image recording apparatus in the coexistence of a plurality of standards for providing image recording services can be achieved.

According to another embodiment of the present invention, an improved image recording system in which image data supplied from an image supply apparatus compatible with the PrintEnhanced standard via an IP network such as a wireless LAN can be recorded using a USB-connectable image recording apparatus compatible with the PictBridge standard can be achieved.

According to still another embodiment of the present invention, a user experience that allows network direct printing from PrintEnhanced-compatible digital cameras in the existence of only existing PictBridge-compatible printers can be achieved.

Other advantages of the present invention will become apparent from the following detailed description of preferred embodiments of the present invention taken in connection with the accompanying drawings.

BRIEF DESCRIPTION OF THE DRAWINGS

FIG. 13 is a diagram showing an example of the description of an XML script;

FIG. 15 is a diagram showing an example of the description of an XHTML document;

FIG. 16A is a diagram showing an example of the description of an XHTML document specifying image data to be printed, a layout of the image data, etc.;

FIG. 16B is a diagram showing the printing of an image formed on a sheet of paper according to the description information shown in FIG. 16A;

FIG. 17 is a diagram showing a direct-printing operation according to the layout finally determined by a printer under the PictBridge standard;

DESCRIPTION OF THE PREFERRED EMBODIMENTS

An embodiment of the present invention will be described in detail hereinafter with reference to the drawings.

Figure 1:
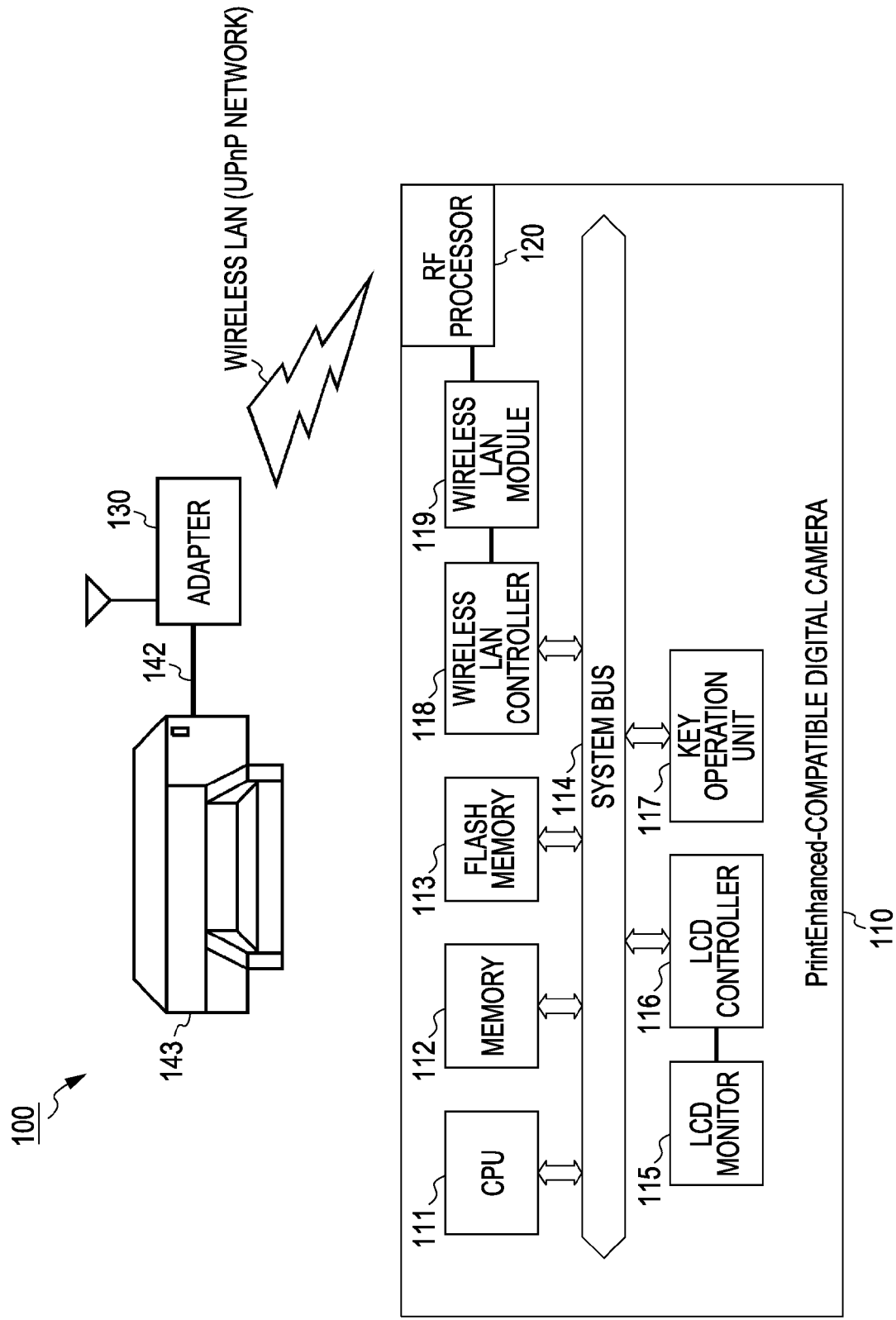
FIG. 1 is a diagram showing the structure of a direct-printing system according to an embodiment of the present invention.

FIG. 1 shows the structure of a direct-printing system 100 according to an embodiment of the present invention. The system 100 shown in FIG. 1 includes a client device 110 that issues a print request to print image data, such as a digital camera, a printer 143 that prints the image data in response to the print request, and an adapter 130 that transfers the print request from the client device 110 to the printer 143.

The client device 110 is compatible with PrintEnhanced standard, and transmits the print request via a wireless LAN. The printer 143 is compatible with the PictBridge standard, and can receive the print request only via a USB cable 142. The adapter 130 is connected, as a "pseudo" PrintEnhanced-compatible printer, i.e., UPnP device, to the wireless LAN on behalf of the PictBridge-compatible printer 143. The adapter 130 is also connected, as a "pseudo" PictBridge-compatible client device, to the printer 143 via the USB cable 142 on behalf of the PrintEnhanced-compatible client device 110.

While one printer is illustrated in the example system structure shown in FIG. 1, there may exist a plurality of printers. However, printers connected to the adapter 130 via USB connections are compatible with the PictBridge standard. The adapter 130 provides a user experience that allows network direct printing from PrintEnhanced-compatible digital cameras in the existence of only existing PictBridge-compatible printers.

As shown in FIG. 1, various modules of the client device 110 are connected to a central processing unit (CPU) 111 via a system bus 114. The CPU 111 loads a predetermined processing program from a flash memory 113 into a memory 112 and executes the loaded program to integrally control the overall operation of the client device 100. Further, the CPU 111 temporarily stores system variables or environmental variables in the memory 112 during execution of the program.

Photographic data taken by a camera block (not shown) is stored in the flash memory 113. The photographic data is read to the memory 112 when the printing operation is performed.

A liquid crystal display (LCD) controller 116 controls the content to be displayed on an LCD monitor 115. For example, a user inputs data using a key operation unit 117 while viewing a display screen of the LCD monitor 115 to operate the client device 110.

Further, a wireless LAN module 119 is connected to the system bus 114 via a wireless LAN interface controller 118, and a radio-frequency (RF) processor 120 is connected as an external interface to the wireless LAN module 119. As shown in FIG. 1, if the RF processor 120 of the client device 110 is located in a communication cell of the adapter 130 operating as an access point (AP), the user can issue a request for printing the photographic data stored in the flash memory 113 using a PrintEnhanced service.

Figure 2:
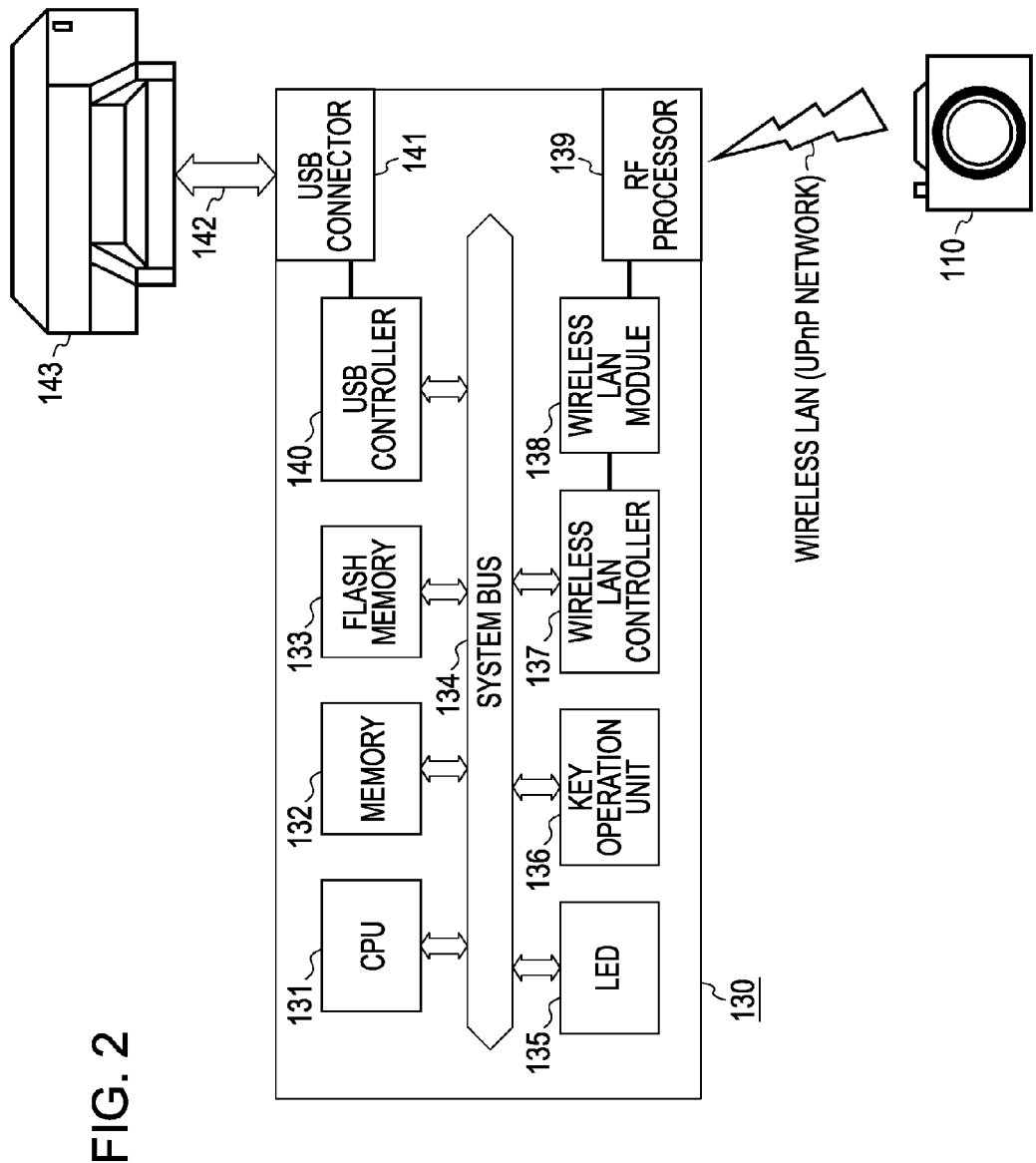
FIG. 2 is a diagram showing the internal structure of an adapter 130.

FIG. 2 shows the internal structure of the adapter 130. The adapter 130 has a wireless LAN access-point function. The adapter 130 is connected, as a pseudo PrintEnhanced-compatible printer, to a wireless LAN on behalf of the PictBridge-compatible printer 143, and is also connected, as a pseudo PictBridge-compatible client device, to the printer 143 via the USB cable 142 on behalf of the PrintEnhanced-compatible client device 110.

Various modules of the adapter 130 are connected to a CPU 131 via a system bus 134. The CPU 131 loads a predetermined processing program from a flash memory 133 into a memory 132, and executes the loaded program to integrally control the overall operation of the adapter 130. Further, the CPU 131 temporarily stores system variables or environmental variables in the memory 132 during execution of the program.

The user can perform the operation setting of the adapter 130 and can change the setting through a key operation unit 136. A light emitting diode (LED) 135 blinks light to notify the operation state of the adapter 130.

A wireless LAN module 138 is connected to the system bus 134 via a wireless LAN interface controller 137, and an RF processor 139 is connected as an external interface to the wireless LAN module 138. Thus, the adapter 130 can operate as an access point within a predetermined communication cell. In the example shown in FIG. 2, on behalf of the PictBridge-compatible printer 143, as a pseudo PrintEnhanced-compatible printer, the adapter 130 can receive a direct-printing request from the PrintEnhanced-compatible client device 110 within the communication cell.

Further, a USB controller 140 is connected to the system bus 134, and a USB connector 141 is connected to the USB controller 140. In the example shown in FIG. 2, on behalf of the PrintEnhanced-compatible client device 110, as a pseudo PictBridge-compatible client device, the adapter 130 issues a print request to the printer 143 via the USB cable 142.

Figure 3:
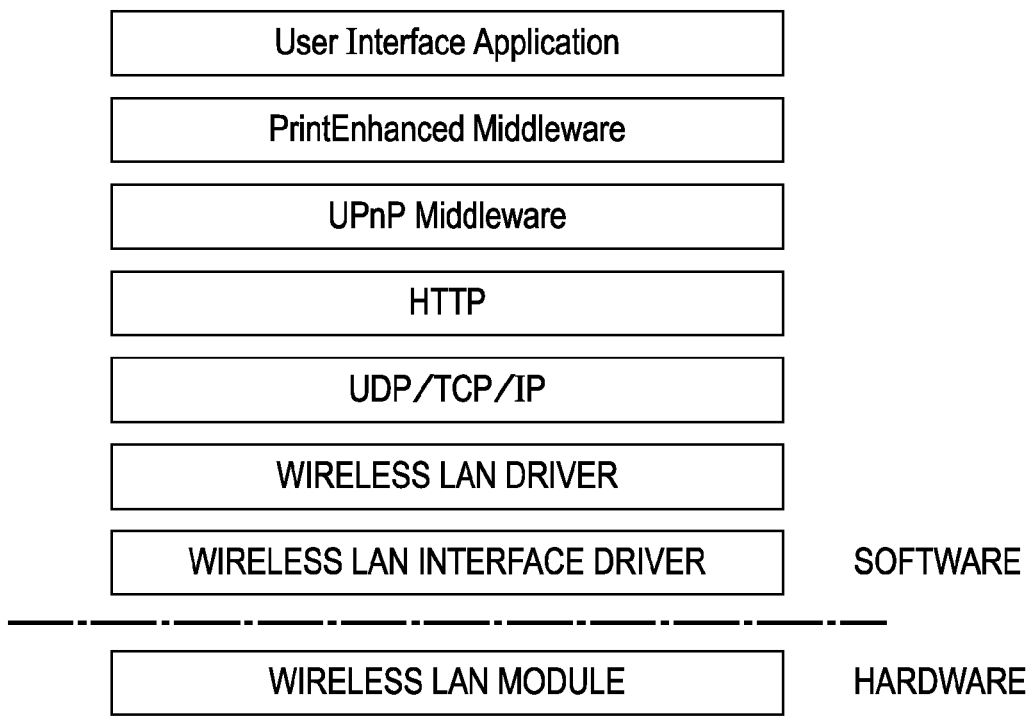
FIG. 3 is a schematic diagram of the protocol stack structure of software for controlling the operation of a PrintEnhanced-compatible client device 110.

FIG. 3 schematically shows the protocol stack structure of software for controlling the operation of the PrintEnhanced-compatible client device 110. As shown in FIG. 3, below the user application, a PrintEnhanced middleware layer, a UPnP middleware layer, a Hyper Text Transfer Protocol (HTTP) layer, a transport layer such as a User Datagram Protocol (UDP) or Transmission Control Protocol (TCP) layer and a network layer such as an Internet Protocol (IP) layer, and driver layers for a wireless LAN and wireless LAN interface are stacked.

Figure 4:
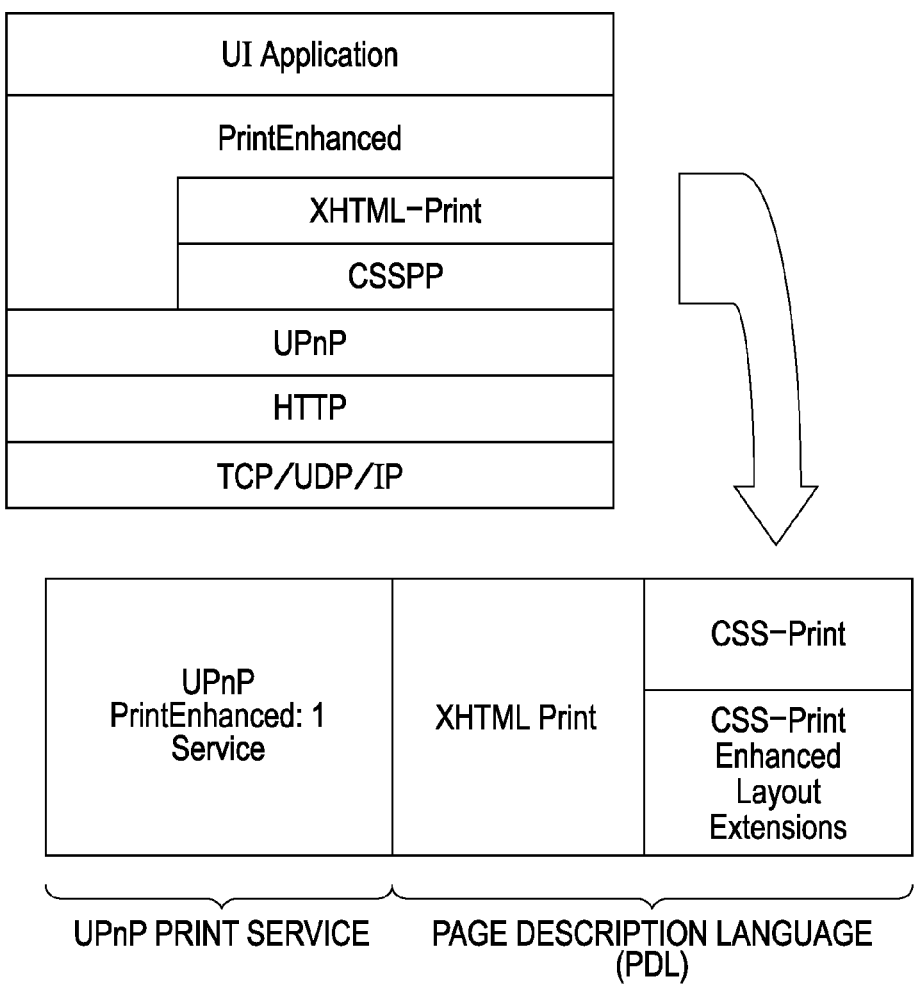
FIG. 4 is a diagram showing the structure of PrintEnhanced middleware in more detail.

FIG. 4 shows the structure of PrintEnhanced middleware in more detail. As shown in FIG. 4, the PrintEnhanced middleware is formed of a UPnP PrintEnhanced: 1 service, which is a standard for printing a photograph over a UPnP network, an XHTML print for defining a method for the layout of a photograph on a sheet of paper, and function modules such as CSS-Print and CSS-Print Layout Extension.

Figure 5:
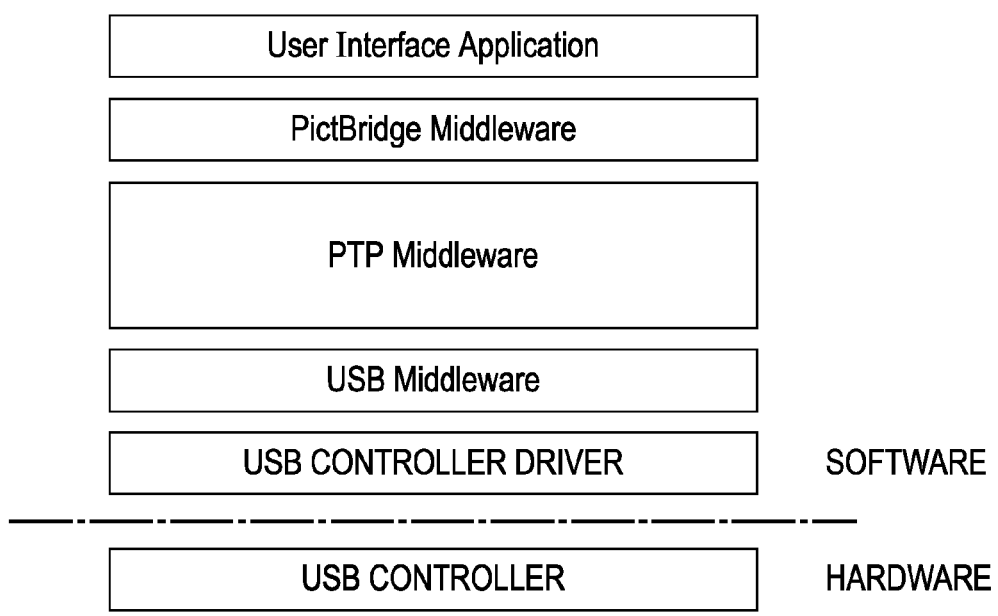
FIG. 5 is a schematic diagram showing the protocol stack structure of software for controlling the operation of a PictBridge compatible printer 143.

FIG. 5 schematically shows the protocol stack structure of software for controlling the operation of the PictBridge-compatible printer 143. As shown in FIG. 5, a PictBridge middleware layer, a PTP middleware layer, a USB middleware layer, and a driver layer for a USB controller are stacked.

Figure 6:
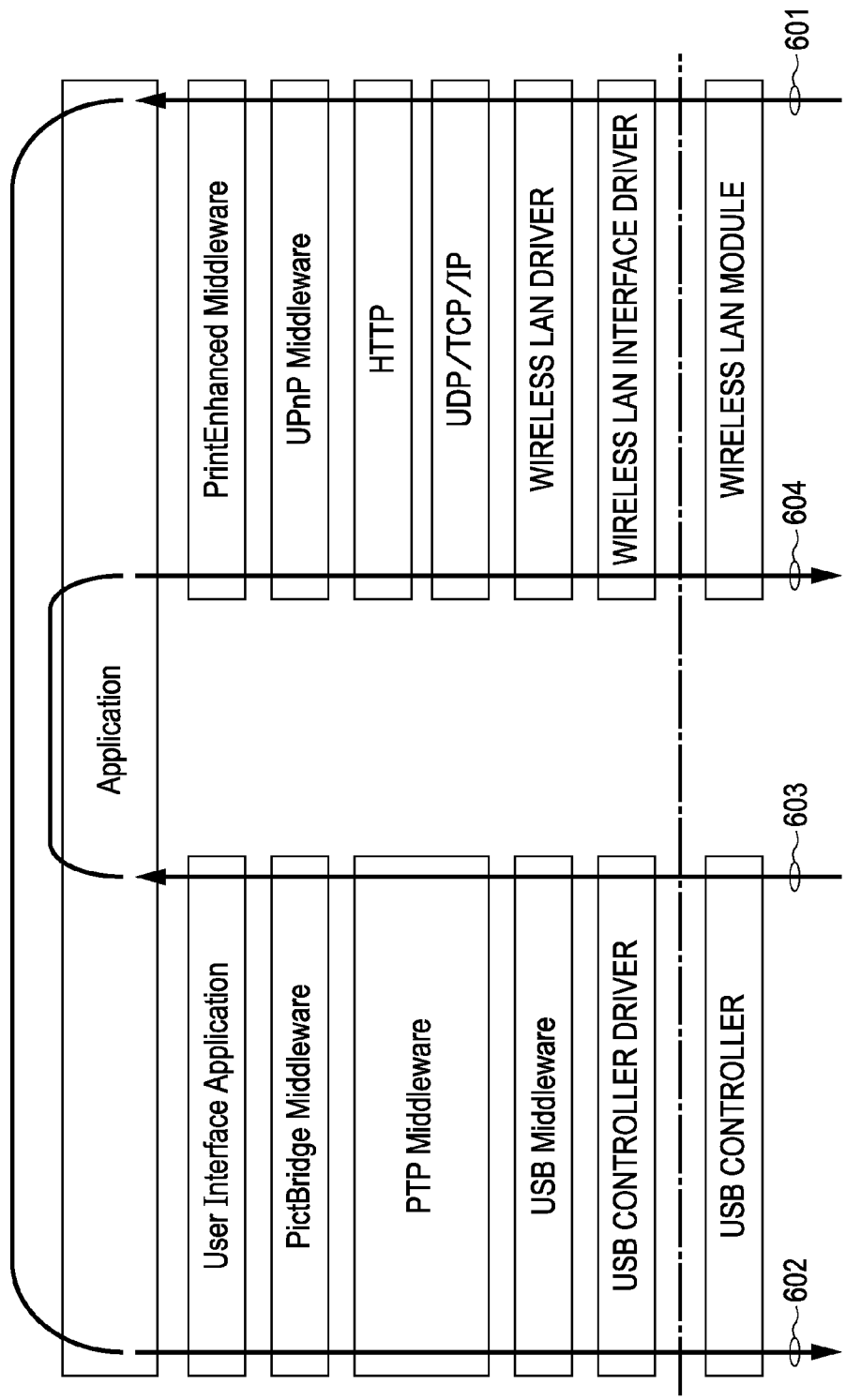
FIG. 6 is a schematic diagram showing the protocol stack structure of software for controlling the operation of the adapter 130.

FIG. 6 schematically shows the protocol stack structure of software for controlling the operation of the adapter 130. As shown in FIG. 6, the adapter 130 implements two direct-printing functions, PictBridge and PrintEnhanced.

On the PictBridge side, a PictBridge middleware layer, a PTP middleware layer, a USB middleware layer, and a driver layer for a USB controller are stacked.

On the PrintEnhanced side, a PrintEnhanced middleware layer, a UPnP middleware layer, an HTTP layer, a transport layer such as a UDP or TCP layer and a network layer such as an IP layer, and driver layers for a wireless LAN and wireless LAN interface are stacked.

Figure 7:
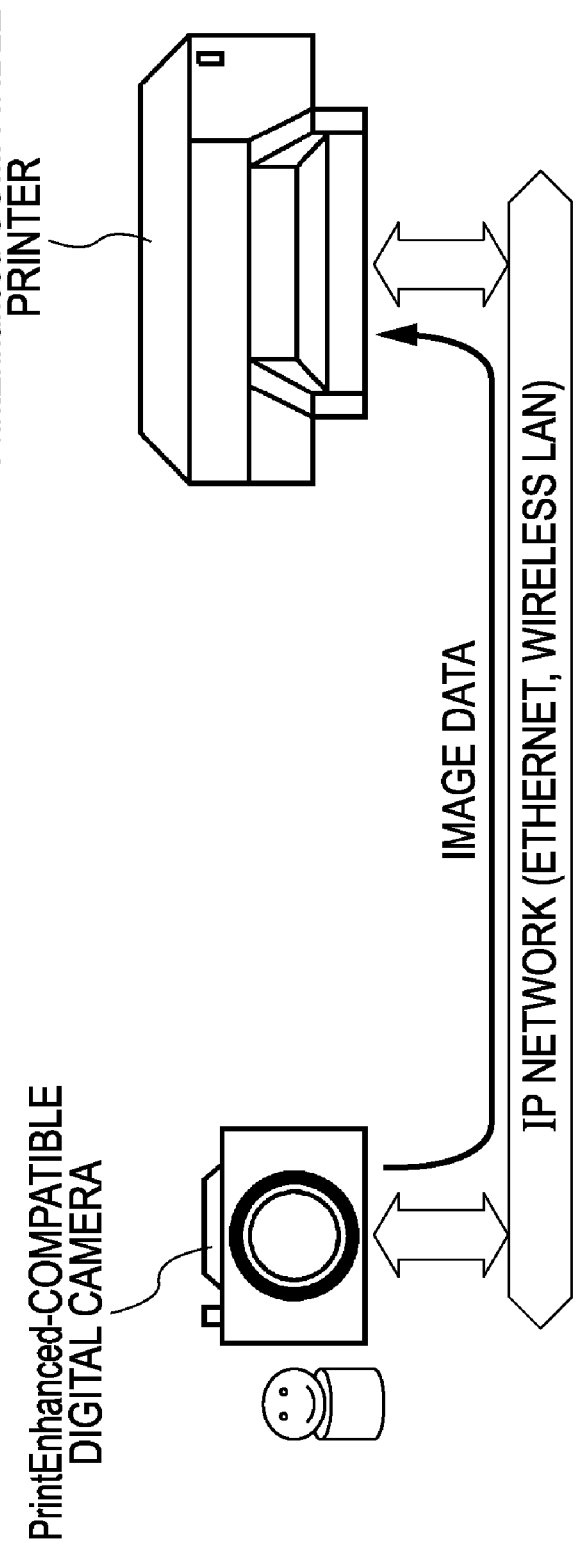
FIG. 7 is a diagram showing a direct-printing operation of image data from a PrintEnhanced-compatible digital camera to a PrintEnhanced-compatible printer.

The application in the uppermost layer implements the operation of acting as a pseudo PrintEnhanced-compatible printer, i.e., UPnP device, on behalf of the PictBridge-compatible printer 143. A command from the client device 110 is transmitted according to the PrintEnhanced service, and is received via the wireless LAN for processing (601). The received command is converted by the application into a PictBridge command, and is then transmitted to the external PictBridge-compatible printer 143 (602). In this case, as viewed from the PrintEnhanced-compatible client device (i.e., digital camera) 110, the direct printing of the image data stored in the flash memory 113 is performed for a PrintEnhanced-compatible printer connected to the same IP network via the Ethernet® or a wireless LAN by performing the camera operation using the key operation unit 117 (see FIG. 7).

Figure 8:
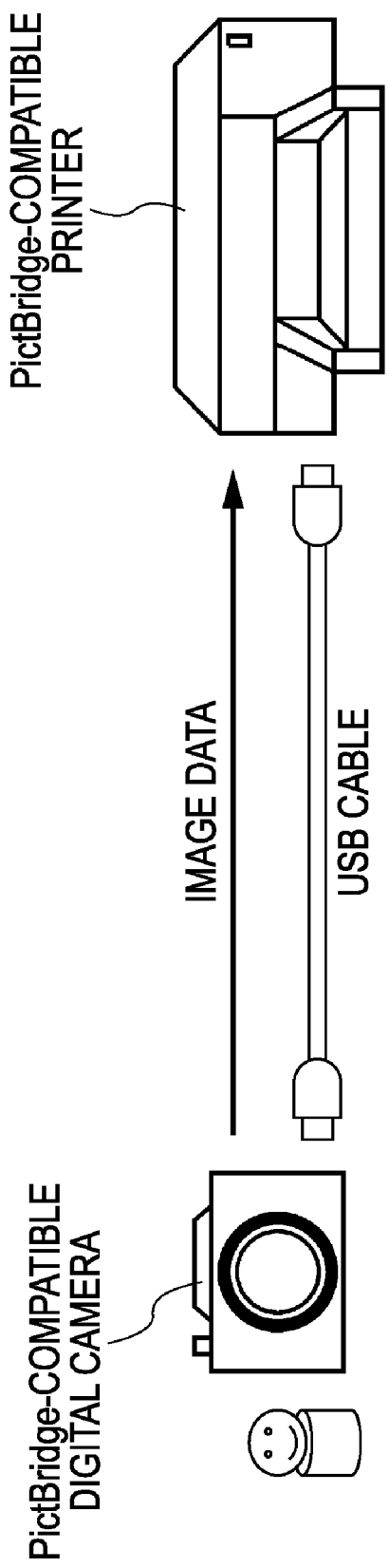
FIG. 8 is a diagram showing a direct-printing operation performed by a PictBridge-compatible printer in response to a request from a PictBridge-compatible digital camera connected thereto via a USB connection.

The application also implements the operation of acting as a pseudo PictBridge-compatible client device on behalf of the PrintEnhanced-compatible client device 110. An event message (603) received from the PictBridge-compatible printer 143 via the USB cable 142 is converted into a PrintEnhanced service command by the application, and is then transmitted to the client device 110 (604). In this case, as viewed from the PictBridge-compatible printer 143, a request for direct printing of an image is issued from a PictBridge-compatible digital camera connected via a USB connection through the camera operation (see FIG. 8).

Figure 9:
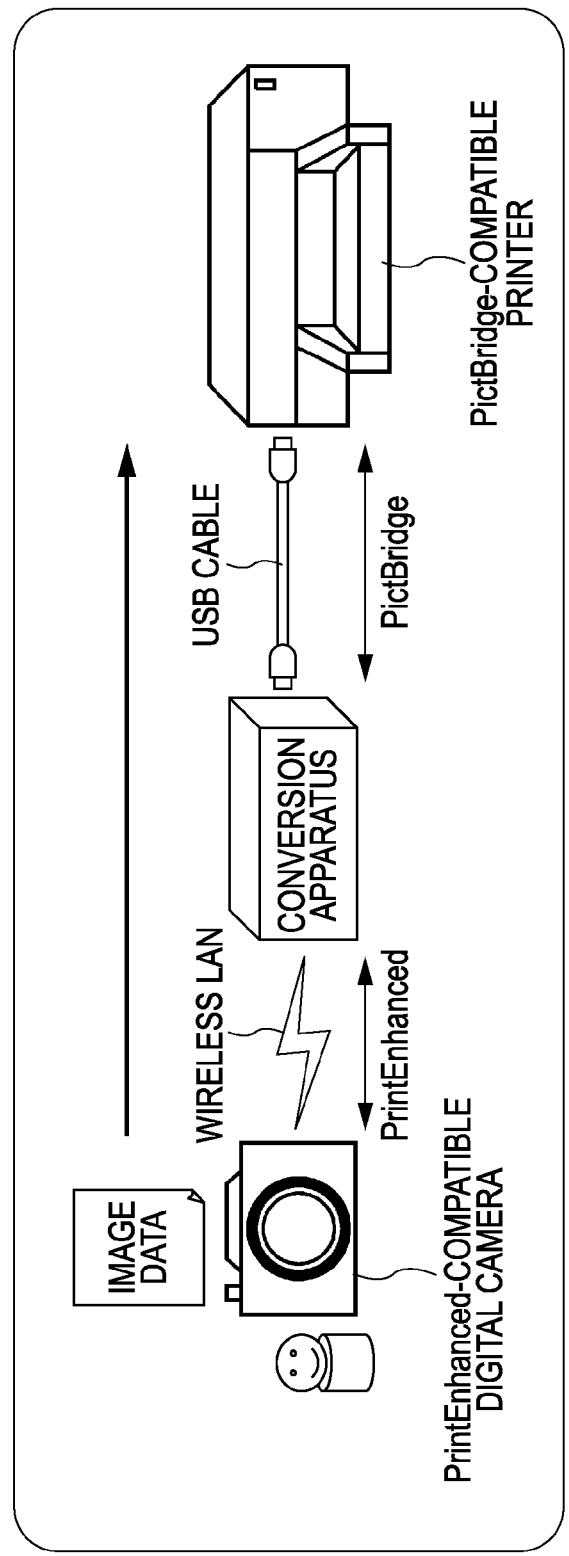
FIG. 9 is a diagram showing that the adapter 130 operates as a conversion apparatus between a PrintEnhanced-compatible digital camera and a PictBridge-compatible printer.
Figure 10:
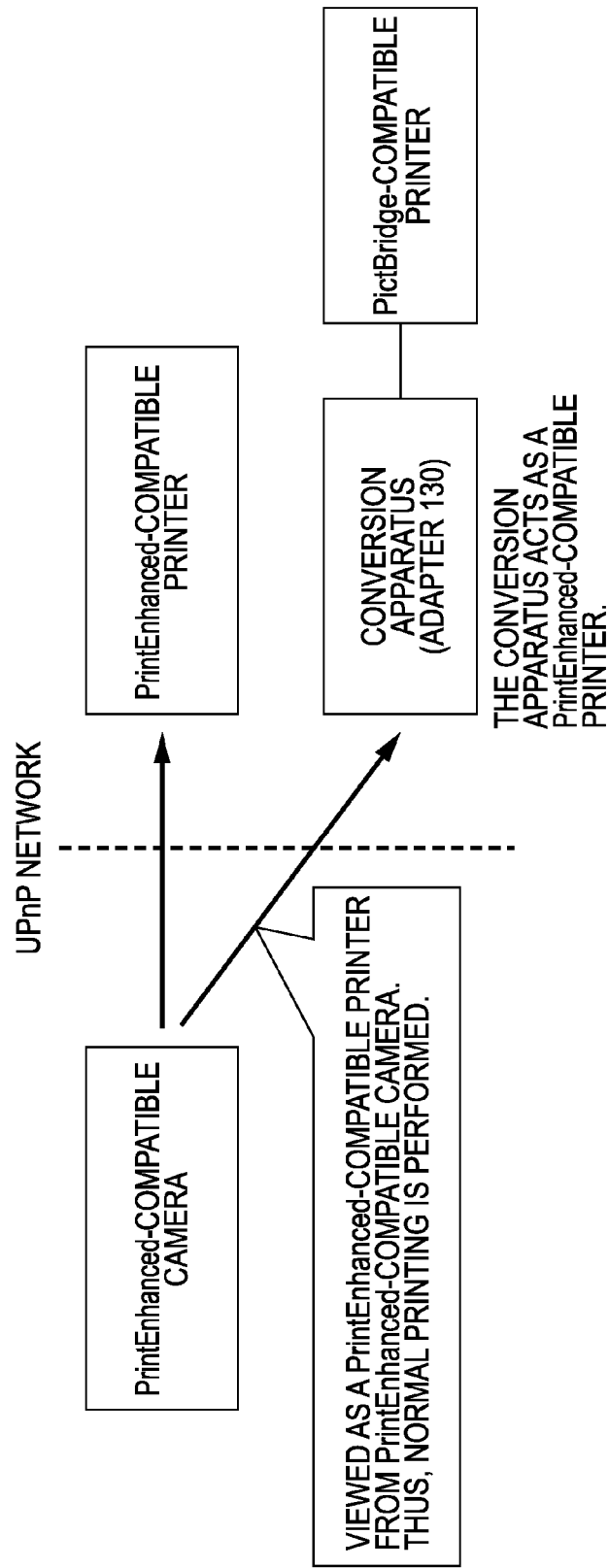
FIG. 10 is a diagram showing a standard direct-printing operation from the client device 110 serving as a PrintEnhanced-compatible digital camera to a PrintEnhanced-compatible printer.

That is, the adapter 130 functions as a conversion apparatus that allows direct printing from a PrintEnhanced-compatible digital camera not only to a PrintEnhanced-compatible printer but also to an existing PictBridge-compatible printer via an IP network (see FIG. 9). Therefore, the client device 110, which is a PrintEnhanced-compatible digital camera, can perform a normal direct-printing operation with a PrintEnhanced-compatible printer (see FIG. 10).

A technical problem with the direct-printing operation performed between the PrintEnhanced-compatible client device 110 and the PictBridge-compatible printer 143 and a method for solving the problem will now be described.

Figure 11:
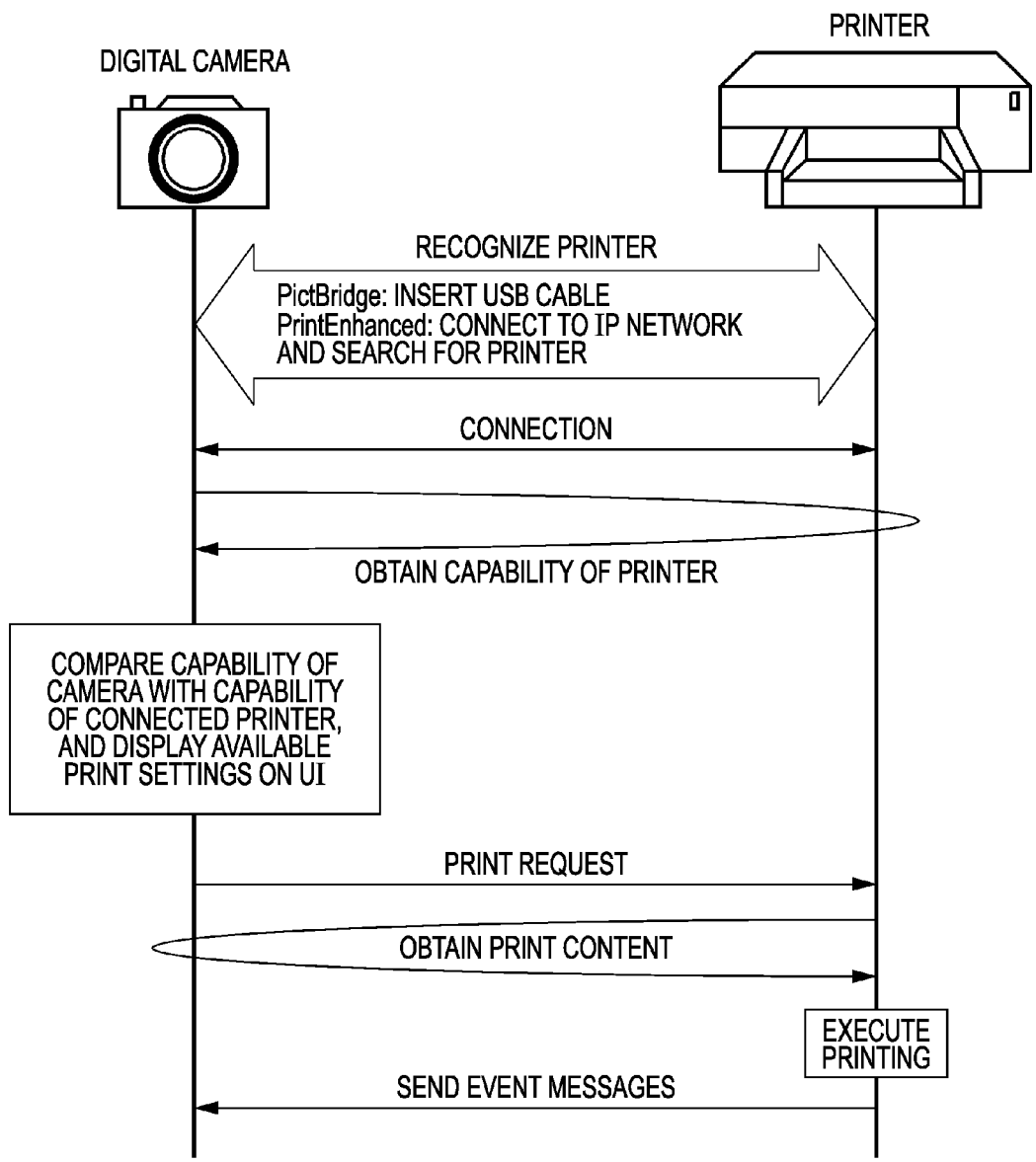
FIG. 11 is a diagram showing a procedure for performing a direct-printing operation.

FIG. 11 shows a procedure for performing a direct-printing operation. As shown in FIG. 11, the direct-printing operation procedure includes a printer recognition and connection process performed by a client device, an initialization process performed by the client device, including acquisition of the printer capability, and a printing process performed by the printer, including a print request, acquisition of content specified by the print request, and notification of various event messages after the printing operation. FIG. 11 schematically shows the procedure, and an adapter provided between the digital camera and the printer is not shown.

The printer is recognized by, in PictBridge, setting a USB cable in the client device, and in PrintEnhanced, connecting the client device to the IP network and searching for the printer on the same network.

Further, the client device compares its capability with the capability of the printer currently connected to the client device, and displays available print settings on a user interface screen. The client device then issues a print request according to the settings specified through the display screen.

The direct-printing operation procedure performed between a PictBridge-compatible digital camera and a PictBridge-compatible printer, and the direct-printing operation procedure performed between a PrintEnhanced-compatible digital camera and a PrintEnhanced-compatible printer will now be described.

Figure 12:
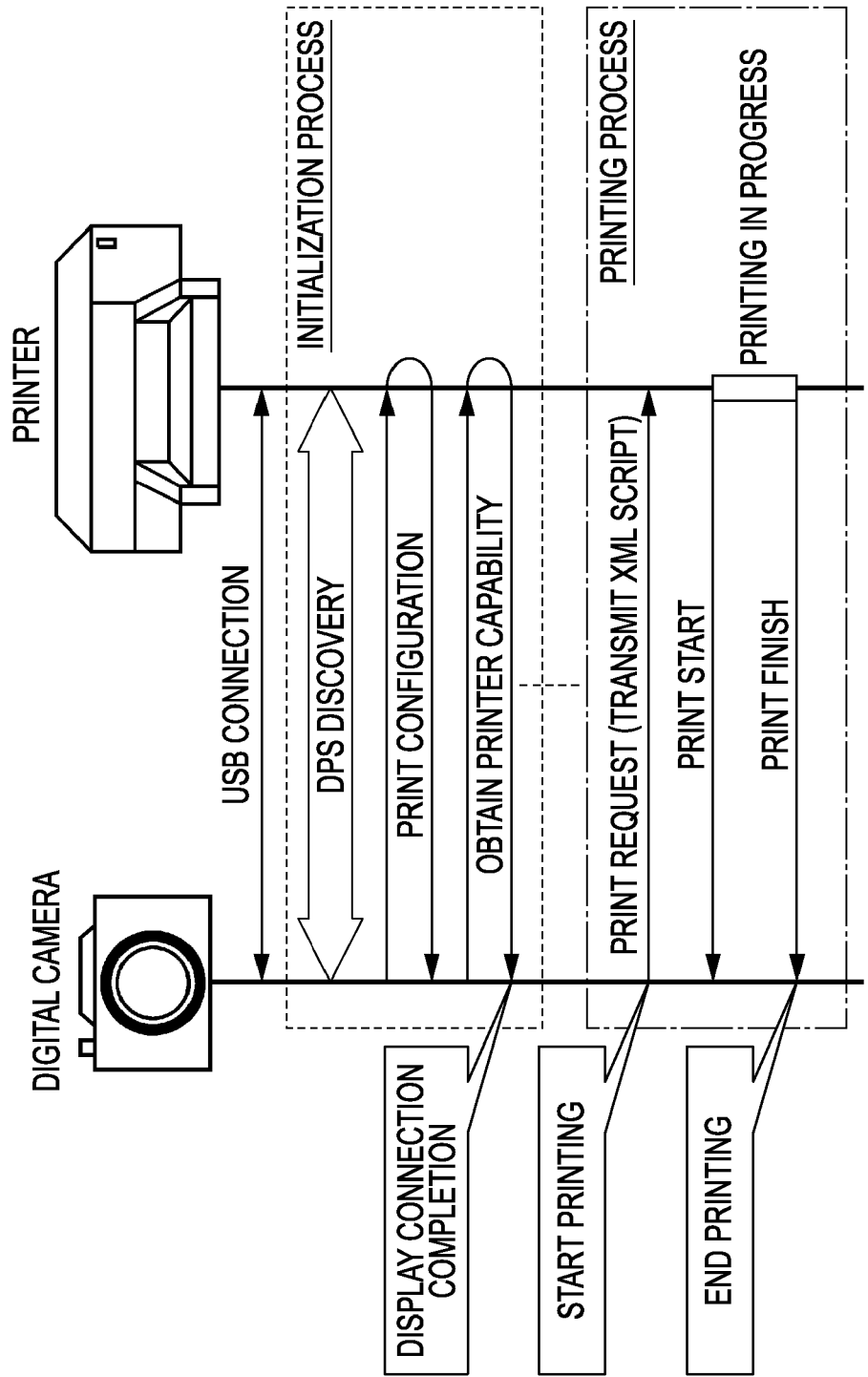
FIG. 12 is a diagram showing a procedure for performing a direct-printing operation between a PictBridge-compatible digital camera and a PictBridge-compatible printer.

FIG. 12 shows a direct-printing operation procedure performed between a PictBridge-compatible digital camera and a PictBridge-compatible printer.

As shown in FIG. 12, the digital camera and the printer are connected via a USB cable. In the direct-printing initialization process, upon detecting a printer by Digital Photo Solution (DPS) discovery, the PictBridge middleware of the digital camera obtains the print configuration and the capability of the printer.

Then, the PictBridge middleware of the digital camera transmits a print request written in an XML script, thereby starting a printing operation. FIG. 13 shows an example of the description of the XML script.

The printer requests the digital camera to transmit image data requested to be printed in the XML script, and performs a printing operation. Further, the printer notifies the digital camera of the progress of the printing process from the start to end of the printing operation.

Figure 14:
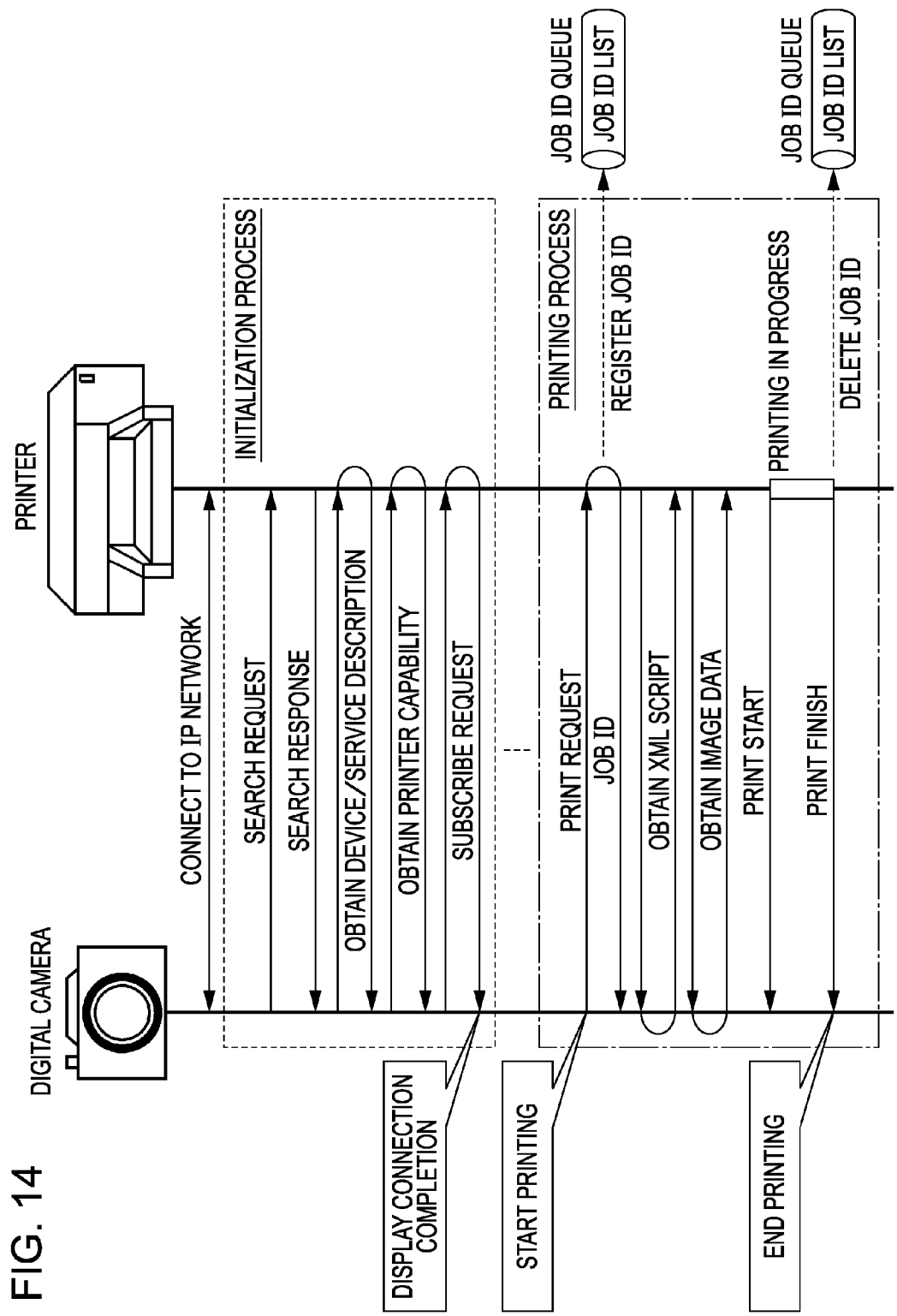
FIG. 14 is a diagram showing a procedure for performing a direct-printing operation between a PrintEnhanced-compatible digital camera and a PrintEnhanced-compatible printer.

FIG. 14 shows a direct-printing operation procedure performed between a PrintEnhanced-compatible digital camera and a PrintEnhanced-compatible printer.

As shown in FIG. 14, the digital camera and the printer are connected via an IP network. In the direct-printing initialization process, the PrintEnhanced middleware of the digital camera transmits a search request, and the printer returns a search response. Further, the PrintEnhanced middleware of the digital camera obtains the device type and service description information (Device/Service Description) from the printer, and issues a subscribe request. Then, the connection process ends.

Thereafter, the PrintEnhanced middleware of the digital camera transmits a print request, thereby starting a printing process. The printer allocates a job ID to the print request, and places the job ID into a job ID queue. Further, the printer returns the job ID to the digital camera, which is the source of the print request.

Then, the PrintEnhanced middleware of the printer obtains an XHTML document specifying an image to be printed, a print layout, etc., from the digital camera, and also obtains the image data specified in the XHTML document from the digital camera. FIG. 15 shows an example of the description of the XHTML document.

Then, the printer prints the image data obtained from the digital camera according to the layout specified in the XHTML document. Further, the printer notifies the digital camera of the progress of the printing process from the start to end of the printing operation. At the end of the printing operation, the corresponding job ID is deleted from the job ID queue.

FIG. 16A shows an example of the description of an XHTML document specifying image data to be printed, a layout of the image data, etc. In FIG. 16A, an XHTML document specifying an image to be printed with date on a sheet of paper of A4 size without margins is illustrated by way of example. FIG. 16B shows the printing of an image formed on a sheet of paper according to the description information shown in FIG. 16A.

As is apparent from the comparison between FIGS. 12 and 14, PictBridge and PrintEnhanced printing services are completely different from each other. Therefore, as shown in FIG. 1, the adapter 130 is provided between the PrintEnhanced-compatible digital camera 110 and the PictBridge-compatible printer 143 to implement direct printing. In this case, several technical problems arise.

One technical problem is the difference in the entity that determines the layout of image data to be printed on a sheet of paper.

Figure 18:
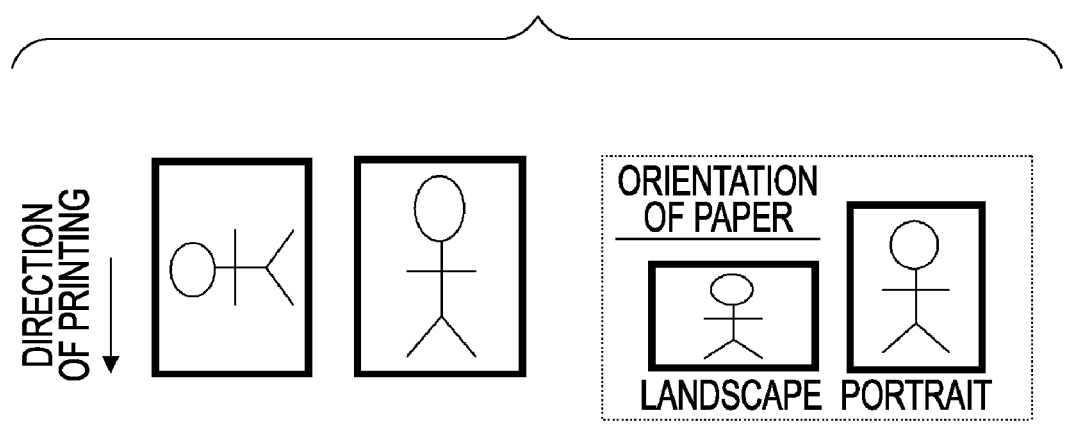
FIG. 18 is a diagram showing the printing direction and the orientation of paper.

In PictBridge, the image layout is finally determined on the printer side. The camera obtains the capability of the printer, and checks command parameters in advance that can be specified for the printer. Then, the camera specifies parameters indicating the desired paper type and the layout (number-up, margin setting, index layout, date stamping, etc.), and issues a print request. The printer determines the actual layout and prints an image (see FIG. 17). For example, the printer suitably determines the printing direction, the orientation of paper, etc., to arrange an image, and prints the image. (see FIG. 18).

Figure 19:
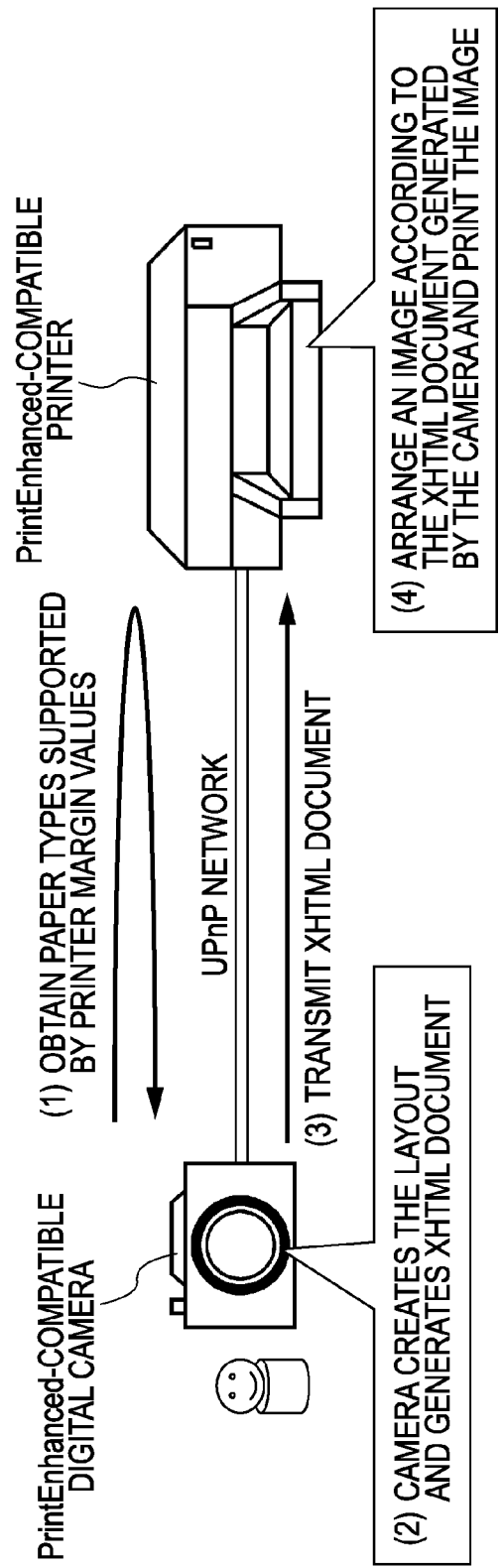
FIG. 19 is a diagram showing a printing operation performed by a printer according to the layout determined by a digital camera under the PrintEnhanced standard.

In PrintEnhanced, on the other hand, the image layout is determined on the digital camera side, and the printer prints an image according to the layout. Upon obtaining information such as paper types supported by the printer or margin values, the digital camera determines the layout (number-up, margin setting, index layout, date stamping, etc.) on the basis of the obtained information to create an XHTML document, and transmits the XHTML document to the printer (see FIG. 19). The layout is determined by the digital camera, and the printer prints an image according to the layout. The orientation in which the image is printed is also specified by the digital camera.

Figure 20:
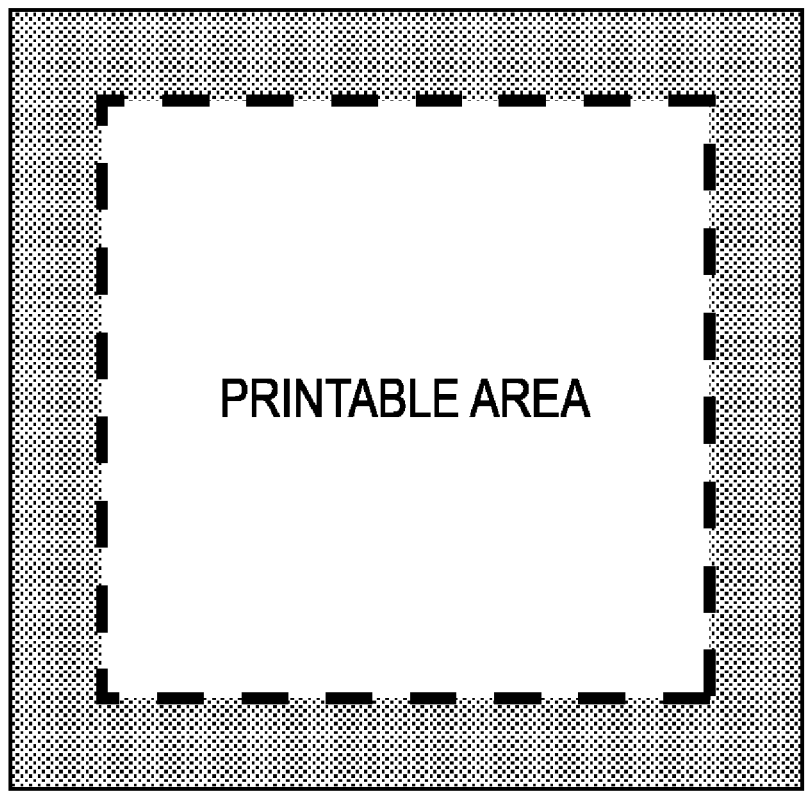
FIG. 20 is a diagram showing a margin region of paper.

In PrintEnhanced, therefore, since the layout is determined on the digital camera side, unlike PictBridge, the digital camera does not obtain the capability of the printer, and is not specified to obtain information equivalent to the capability of the printer. However, if the paper types supported by the printer are not known, it is difficult to determine the layout. Therefore, as in PictBridge, the digital camera can obtain information relating to the paper sizes supported in the capability of the printer. Unlike PictBridge, the digital camera can also obtain information concerning a margin region of paper (see FIG. 20). The margin region is a region in which it is ensured that even if paper fed into the printer is skewed, an image is formed within the paper. The digital camera determines the layout so that an image and text are arranged (in the printable area) inside the margin region.

In PrintEnhanced, once the digital camera creates an XHTML document specifying various layout parameters, the printer accepts the parameters. In the system configuration shown in FIG. 1, therefore, in a print request, layout parameters that are not available on the PictBridge-compatible printer 143 may be set by the digital camera serving as the client device 110.

One conceivable solution to this problem is that the client device (digital camera) 110 obtains the capability of the printer 143. However, the PrintEnhanced standard does not specify means for notifying the capability equivalent to that in the PictBridge standard.

The adapter 130 provides a user experience that allows network direct printing from PrintEnhanced-compatible digital cameras in the existence of only existing PictBridge-compatible printers. However, as described above, in the connection of two completely different types of printing services, it is technically difficult to completely convert a command between the two printing services. In the present embodiment, therefore, the adapter 130 performs the following operation.

(1) Upon establishing a connection with a PictBridge-compatible printer via a USB cable, the adapter 130 obtains necessary information and creates a profile of a PrintEnhanced-compatible printer.

(2) When participating in a UPnP network, the adapter 130 acts as a pseudo PrintEnhanced-compatible printer, and embeds an identifier indicating a pseudo printer in a printer profile to be transmitted to the PrintEnhanced-compatible digital camera.

(3) Upon receiving any command from the PrintEnhanced-compatible digital camera via UPnP, the adapter 130 converts the command into a PictBridge command, and transmits the resulting command to the PictBridge-compatible printer via the USB cable.

(4) Upon receiving from the PrintEnhanced-compatible digital camera a script (XHTML document) including information relating to the layout of image data to be printed on paper, the adapter 130 extracts necessary information (i.e., layout information that can be set by the digital camera in the PictBridge standard) from the script to generate a PictBridge command (or PictBridge print script written in the XML form), and transmits the generated command to the PictBridge-compatible printer via the USB cable.

(5) Upon receiving a command or event (including an error message and a notification of the progress of the printing process) from the PictBridge-compatible printer, the adapter 130 converts the command or event into a PrintEnhanced message, and transmits the message to the PrintEnhanced-compatible digital camera via a wireless LAN.

The PrintEnhanced-compatible digital camera serving as the client device 110, on the other hand, in the printing initialization processing, checks the printer profile to determine whether or not an identifier indicating a pseudo PrintEnhanced-compatible printer has been embedded in the printer profile. If the identifier is detected, it is determined that a PictBridge-compatible printer, rather than a PrintEnhanced-compatible printer, actually performs a printing operation. As described above, the layout that can be set by the digital camera in the PictBridge standard has more limitations than the PrintEnhanced standard. Therefore, the PrintEnhanced-compatible digital camera displays only minimum functions permitted in the PictBridge standard on a layout setting user interface (UI) screen displayed on the LCD monitor 115.

Figure 21:
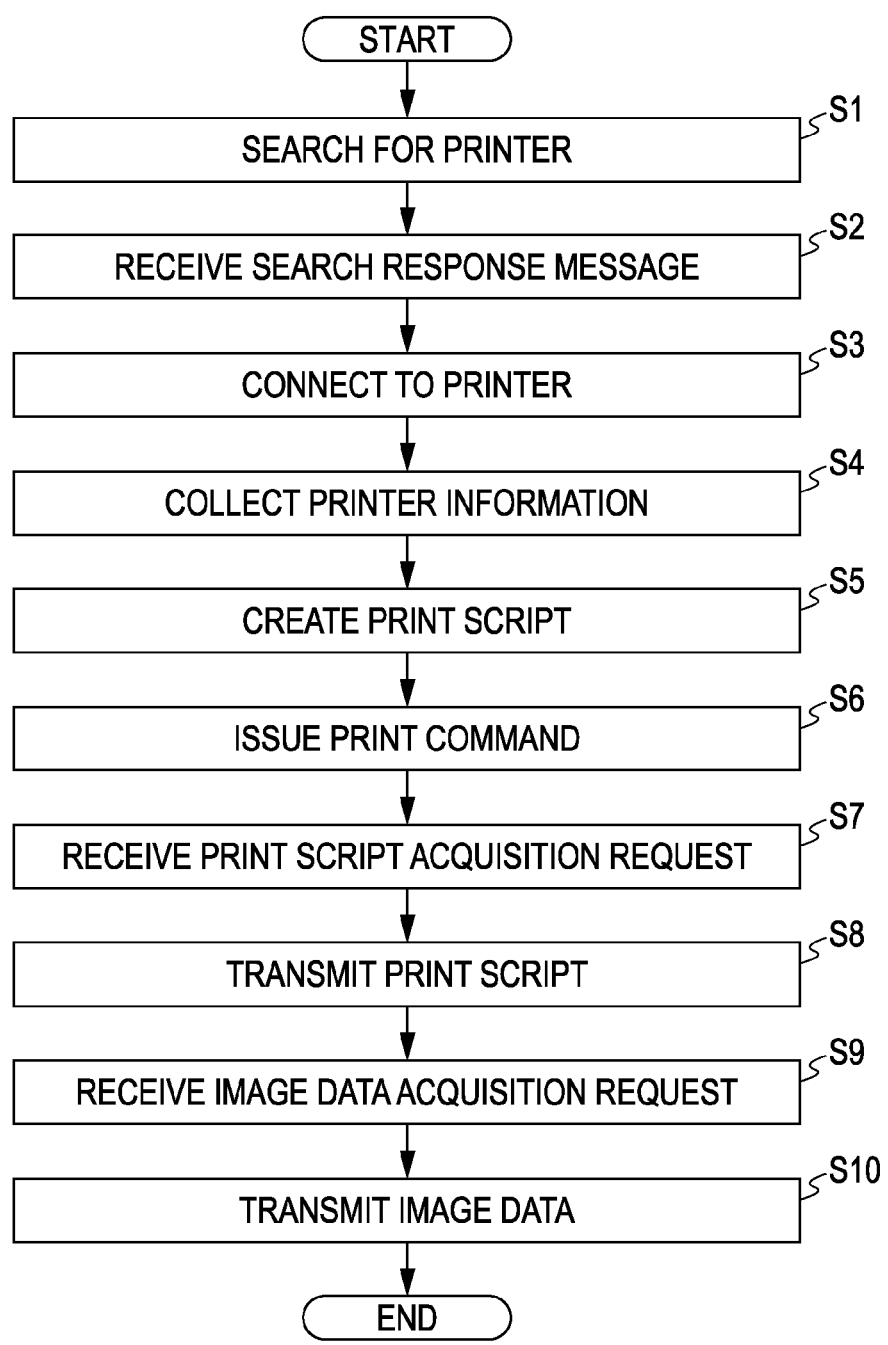
FIG. 21 is a flowchart showing a procedure performed by a PrintEnhanced-compatible digital camera over a UPnP network.

FIG. 21 is a flowchart showing a procedure performed over the UPnP network by a PrintEnhanced-compatible digital camera serving as the client device 110 requesting the printing of image data.

When participating in a UPnP network, first, the PrintEnhanced-compatible digital camera searches for a printer according to the UPnP requirements (step S1). Upon receiving a response message from a printer (step S2), the PrintEnhanced-compatible digital camera can discover a PrintEnhanced-compatible printer.

Then, the PrintEnhanced-compatible digital camera establishes a connection with the discovered printer (step S3). In the connection process, the PrintEnhanced-compatible digital camera collects information regarding the properties of the printer, i.e., the profile of the PrintEnhanced-compatible printer (step S4).

Then, the PrintEnhanced-compatible digital camera generates an XHTML document as a print script in accordance with the collected printer information (step S5), and issues a print command to the PrintEnhanced-compatible printer (step S6).

The print command includes the location of the print script. The PrintEnhanced-compatible digital camera receives from the printer an acquisition request of the print script whose location is specified (step S7). In response to the acquisition request of the print script, the PrintEnhanced-compatible digital camera transmits the print script to the requesting printer (step S8).

The transmitted print script includes the location of an image to be printed. The PrintEnhanced-compatible digital camera receives from the printer an acquisition request of the image data whose location is specified (step S9). Then, the PrintEnhanced-compatible digital camera transmits the image data to the requesting printer (step S10). As a result, the printer prints the transmitted image data according to the layout described in the print script.

Figure 22:
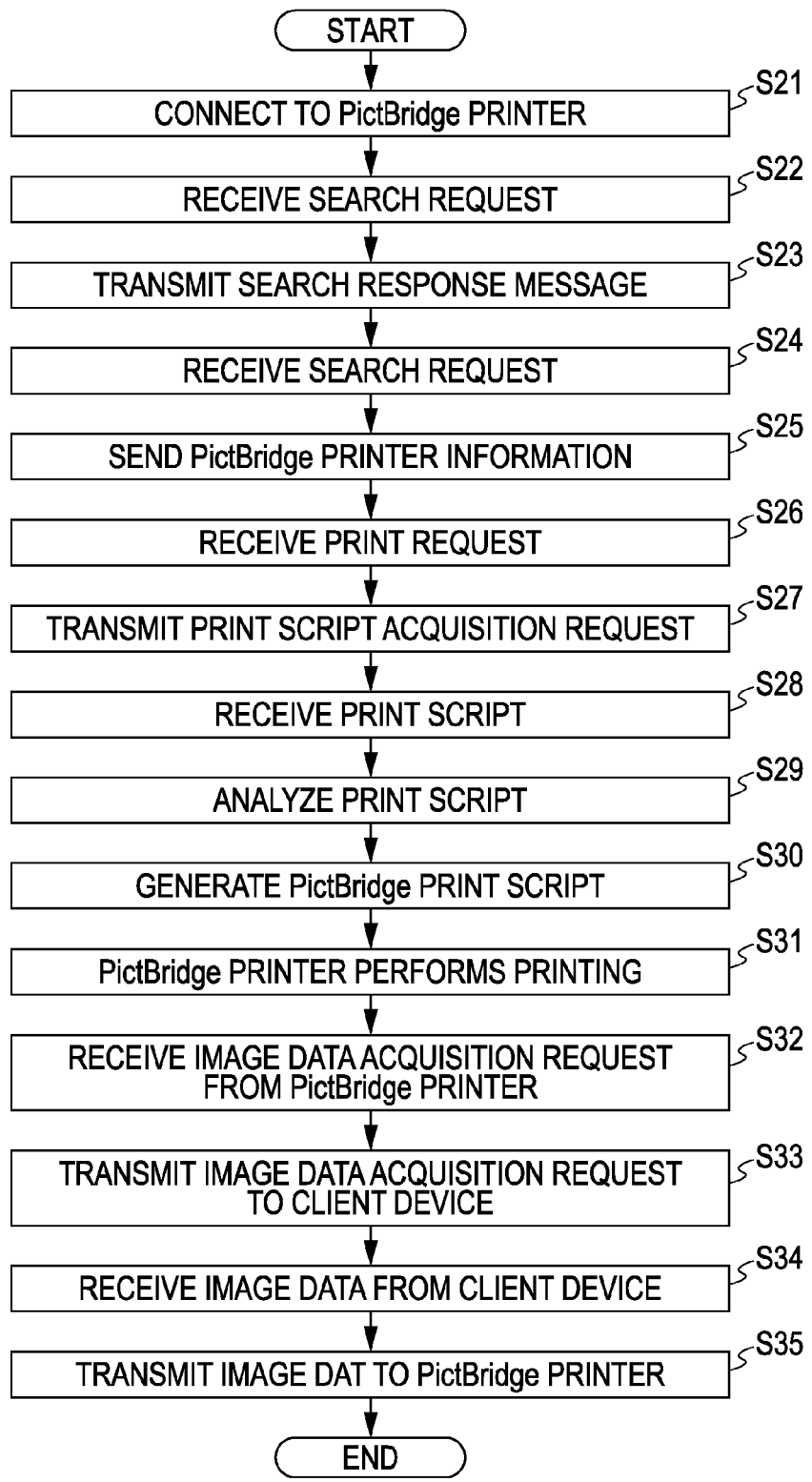
FIG. 22 is a flowchart showing a procedure performed by the adapter 130 provided between the client device 110 serving as a PrintEnhanced-compatible digital camera and the PictBridge-compatible printer 143 via a UPnP network and the USB cable 142.

FIG. 22 is a flowchart showing a procedure performed by the adapter 130 provided between the PrintEnhanced-compatible digital camera 110 and the PictBridge-compatible printer 143 via the UPnP network and the USB cable 142.

First, the adapter 130 establishes a connection with the PictBridge-compatible printer 143 via the USB cable 142 (step S21), and collects information such as the capability of the PictBridge-compatible printer 143. Then, the adapter 130 creates a profile of a PrintEnhanced-compatible printer.

The adapter 130 serves as an access point of a wireless LAN, and manages a communication cell as a UPnP network. Upon receiving a printer search request complying with the UPnP requirements from a client device participating in the UPnP network, such as the PrintEnhanced-compatible digital camera 110 (step S22), the adapter 130 acts as a pseudo PrintEnhanced-compatible printer and transmits a search response message (step S23).

Upon receiving a connection request from the client device (step S24), the adapter 130 returns the profile (described above) generated by the adapter 130 as a pseudo PrintEnhanced-compatible printer on the basis of the information regarding the PictBridge printer 143 (step S25).

When a print request is issued from the client device (step S26), the adapter 130 specifies location information included in the print request, and issues a print script acquisition request (step S27).

Upon receiving a print script from the client device (step S28), the adapter 130 analyzes the received print script, i.e., the XHTML document (step S29). Then, the adapter 130 extracts only information necessary for PictBridge, i.e., layout information that can be set by a digital camera in the PictBridge standard.

Then, the adapter 130 generates a XML print script according to the PictBridge standard (step S30), and the PictBridge-compatible printer 143 connected to the adapter 130 via the USB cable 142 performs a printing operation (step S31).

When an acquisition request of image data is issued from the PictBridge-compatible printer 143 via the PTP protocol (step S32), the adapter 130 converts the request into the HTTP protocol, and issues an image data acquisition request to the client device (step S33).

Upon receiving the image data from the client device (step S34), the adapter 130 converts the image data into the PTP protocol, and transmits the resulting image data to the PictBridge-compatible printer 143 via the USB cable 142 as a command complying with the PictBridge standard (step S35).

In the direct-printing system according to the present embodiment, therefore, image data supplied from a PrintEnhanced-compatible digital camera via a wireless LAN can be directly printed using a PictBridge-compatible printer.

Currently, the PictBridge standard is dominant in a direct-printing system, and there may be an environment where only existing PictBridge-compatible printers are present. In the present embodiment, an adapter can provide a user experience that allows network direct printing from PrintEnhanced-compatible digital cameras.

While a specific embodiment of the present invention has been descried in detail, it is to be understood that a variety of modifications or changes can be made to the above-described embodiment by persons skilled in the art without departing from the scope of the present invention.

While the coexisting direct-printing service standards have been described herein in the context of PictBridge and PrintEnhanced, the scope of the present invention is not limited to these standards, and any other combination of standards may be used.

That is, an exemplary embodiment of the present invention has been disclosed, and is not construed as limiting the invention. The scope of the present invention should be determined by the appended claims.

It should be understood by those skilled in the art that various modifications, combinations, sub-combinations and alterations may occur depending on design requirements and other factors insofar as they are within the scope of the appended claims or the equivalents thereof.

What is claimed is:

1. An image recording system for providing an image data recording service, comprising:
    an image supply apparatus compatible with a first standard for providing a first type of image recording service and configured to supply image data;
    an image recording apparatus compatible with a second standard for providing a second type of image recording service and configured to record the image data; and
    a conversion apparatus that connects between the image supply apparatus and the image recording apparatus, the conversion apparatus being a separate apparatus from the image supply apparatus and the image recording apparatus,
    wherein,
        the conversion apparatus (a) connects, as a pseudo image recording apparatus compatible with the first standard, to the image supply apparatus via a first communication medium compatible with the first standard and (b) connects, as a pseudo image supply apparatus compatible with the second standard, to the image recording apparatus via a second communication medium compatible with the second standard, and
        the conversion apparatus is (i) configured to convert a command received from the image supply apparatus into a command complying with the second standard and transmit the command complying with the second standard to the image recording apparatus, and (ii) configured to convert a command received from the image recording apparatus or event information relating to an image recording process into a message complying with the first standard and transmit the message complying with the first standard to the image supply apparatus.

2. The image recording system according to claim 1, wherein:
    the first standard comprises a PrintEnhanced standard based on Universal Plug and Play (UPnP™), and
    the second standard comprises a PictBridge standard established by the Camera & Imaging Products Association.

3. The image recording system according to claim 1, wherein:
    the second standard specifies that an image-recording layout be determined on the image recording apparatus side,
    the first standard specifies that an image-recording layout be determined on the image supply apparatus side, and
    upon receiving a script including information specifying an image-recording layout from the image supply apparatus, the conversion apparatus extracts information that can be set by the image supply apparatus in the second standard from the received script, converts the extracted information into a script in a format complying with the second standard, and transmits the converted script to the image recording apparatus.

4. The image recording system according to claim 3, wherein upon establishing a connection with the image recording apparatus via the second communication medium, the conversion apparatus obtains a profile from the image recording apparatus, and based on the profile obtained from the image recording apparatus, creates a profile of an image recording apparatus compatible with the first standard.

5. The image recording system according to claim 4, wherein upon connecting to the first communication medium, the conversion apparatus embeds identification information in the created profile, the identification information indicating that the conversion apparatus connected to the first communication medium acts as the pseudo image recording apparatus compatible with the first standard.

6. The image recording system according to claim 5, wherein based on the identification information, the image supply apparatus identifies that the image recording apparatus compatible with the first standard is the conversion apparatus.

7. The image recording system according to claim 6, wherein when the image supply apparatus identifies that an entity to which an image recording request is to be issued is the conversion apparatus, the image supply apparatus provides a user with operating means for specifying only an image-recording layout that can be set by the image supply apparatus compatible with the second standard.

8. An adapter apparatus to connect between an image supply apparatus and an image recording apparatus, the adapter apparatus comprising:
  first connecting means for connecting to the image supply apparatus supplying image data via a first communication medium compatible with a first standard for providing a first type of image recording service;
  second connecting means for connecting to the image recording apparatus recording the image data via a second communication medium compatible with a second standard for providing a second type of image recording service;
  first command converting means for converting a command received from the image supply apparatus into a command complying with the second standard and transmitting the command complying with the second standard to the image recording apparatus; and
  second command converting means for converting a command received from the image recording apparatus or event information relating to an image recording process into a message complying with the first standard and transmitting the message complying with the first standard to the image supply apparatus,
  wherein,
    the adapter apparatus is a separate apparatus from the image supply apparatus and the image recording apparatus.

9. The adapter apparatus according to claim 8, wherein:
  the first standard comprises a PrintEnhanced standard providing an image recording service based on Universal Plug and Play (UPnP™), and
  the second standard comprises a PictBridge standard established by the Camera & Imaging Products Association.

10. The adapter apparatus according to claim 8, wherein:
  the second standard specifies that an image-recording layout be determined on the image recording apparatus side,
  the first standard specifies that an image-recording layout be determined on the image supply apparatus side, and
  upon receiving a script including information specifying an image-recording layout from the image supply apparatus, the first converting means extracts information that can be set by the image supply apparatus in the second standard from the received script, converts the extracted information into a script in a format complying with the second standard, and transmits the converted script to the image recording apparatus.

11. The adapter apparatus according to claim 10, further comprising:
  profile managing means for obtaining a profile from the image recording apparatus upon establishing a connection with the image recording apparatus via the second communication medium, and based on the profile obtained from the image recording apparatus, creating a profile of an image recording apparatus compatible with the first standard.

12. The adapter apparatus according to claim 11, wherein the profile managing means embeds identification information in the created profile, the identification information indicating a pseudo image recording apparatus compatible with the first standard.

13. An image recording method for recording image data supplied from an image supply apparatus, the image supply apparatus compatible with a first standard for providing a first type of image recording service, using an image recording apparatus compatible with a second standard for providing a second type of image recording service, the method comprising:
  carrying out at a conversion apparatus connected between the image supply apparatus and the image recording apparatus, the conversion apparatus connected to the image supply apparatus via a first communication medium and connected to the image recording apparatus via a second communication medium, and the conversion apparatus being a separate apparatus from the image supply apparatus and the image recording apparatus, the functions of:
    converting a command received from the image supply apparatus into a command complying with the second standard and transmitting the command complying with the second standard to the image recording apparatus; and
    converting a command received from the image recording apparatus or event information relating to an image recording process into a message complying with the first standard and transmitting the message complying with the first standard to the image supply apparatus.

14. The image recording method according to claim 13, wherein:
  the first standard comprises a PrintEnhanced standard providing an image recording service based on Universal Plug and Play (UPnP™), and
  the second standard comprises a PictBridge standard established by the Camera & Imaging Products Association.

15. The image recording method according to claim 13, wherein:
  the second standard specifies that an image-recording layout be determined on the image recording apparatus side, the first standard specifies that an image-recording layout be determined on the image supply apparatus, the image recording method further comprising the conversion apparatus carrying out the functions of:

receiving a script including information specifying an image-recording layout from the image supply apparatus;

extracting information that can be set by the image supply apparatus in the second standard from the received script;

converting the extracted information into a script in a format complying with the second standard; and transmitting the converted script to the image recording apparatus.

16. The image recording method according to claim 15, further comprising the conversion apparatus carrying out the function of:

upon establishing a connection with the image recording apparatus via the second communication medium, obtaining a profile from the image recording apparatus; and based on the profile obtained from the image recording apparatus, creating a profile of an image recording apparatus compatible with the first standard.

17. The image recording method according to claim 16, further comprising the conversion apparatus carrying out the function of:

embedding identification information in the created profile, the identification information indicating a pseudo image recording apparatus compatible with the first standard.

18. An adapter apparatus to connect between an image supply apparatus and an image recording apparatus, the adapter apparatus comprising:

a first connector that connects to the image supply apparatus supplying image data via a first communication medium, the image supply apparatus compatible with a first standard for providing a first type of image recording service;

a second connector that connects to the image recording apparatus recording the image data via a second communication medium, the image recording apparatus compatible with a second standard for providing a second type of image recording service;

a first command converter that converts a command received from the image supply apparatus into a command complying with the second standard and transmitting the command complying with the second standard to the image recording apparatus; and a second command converter that converts a command received from the image recording apparatus or event information relating to an image recording process into a message complying with the first standard and transmitting the message complying with the first standard to the image supply apparatus, wherein, the adapter apparatus is a separate apparatus from the image supply apparatus and the image recording apparatus.

19. The image recording system according to claim 5, wherein the image supply apparatus comprises:

an obtaining unit that, upon establishing a connection with the conversion apparatus via the first communication medium, obtains the profile created by the conversion apparatus, a determining unit that determines whether or not the profile obtained from the conversion apparatus includes the identification information indicating the pseudo image recording apparatus compatible with the first standard, a storage unit that stores image data to be supplied, a layout determining unit that determines a layout in which the stored image data is recorded according to whether or not the profile obtained from the conversion apparatus includes the identification information, and a requesting unit that requests recording of the image data according to the determined layout.

* * * * *